United States Patent [19]
Furukawa et al.

[11] Patent Number: 5,717,929
[45] Date of Patent: Feb. 10, 1998

[54] APPARATUS AND METHOD FOR PROGRAM EXECUTION, AND IMAGE REPRODUCTION APPARATUS WITH SPECIAL EFFECTS UTILIZING SUCH APPARATUS AND METHOD

[75] Inventors: Riichi Furukawa; Youji Sugiura, both of Gifu, Japan

[73] Assignee: Sanyo Electric Co., Ltd., Osaka, Japan

[21] Appl. No.: 218,913

[22] Filed: Mar. 28, 1994

[30] Foreign Application Priority Data

| Mar. 30, 1993 | [JP] | Japan | 5-072305 |
| Dec. 17, 1993 | [JP] | Japan | 5-318069 |
| Dec. 28, 1993 | [JP] | Japan | 5-336632 |

[51] Int. Cl.$^6$ .................................................. G06F 9/44
[52] U.S. Cl. ............................................ 395/703; 348/744
[58] Field of Search ............................. 395/700, 650; 353/122, 83, 48; 348/739, 744, 552

[56] References Cited

U.S. PATENT DOCUMENTS

| 3,922,081 | 11/1975 | Uchidoi et al. | 353/83 |
| 4,860,203 | 8/1989 | Corrigan et al. | 364/300 |
| 4,943,912 | 7/1990 | Aoyama et al. | 395/650 |
| 5,140,425 | 8/1992 | Yamaguchi et al. | 348/561 |
| 5,283,638 | 2/1994 | Engberg et al. | 348/14 |
| 5,428,417 | 6/1995 | Lichtenstein | 353/122 |

FOREIGN PATENT DOCUMENTS

| 416509 | 3/1991 | European Pat. Off. | G05B 19/05 |
| 62-210508A | 9/1987 | Japan | G05B 19/405 |
| 4-178831 | 6/1992 | Japan . | |

OTHER PUBLICATIONS

Sanyo Technical Review, vol. 22, No. 3; Oct. 1990; pp. 26–41; (Hi–Vision Videograph).

*Primary Examiner*—Alvin E. Oberley
*Assistant Examiner*—St. John Courtenay, III
*Attorney, Agent, or Firm*—Armstrong, Westerman, Hattori, McLeland & Naughton

[57] ABSTRACT

The present image reproduction apparatus detects a comment statement provided to a program code statement, and executes a processing according to a special command for executing an image effect inherent in the image reproduction apparatus if such a special command is present in the comment statement, ignoring the original program code statement. Thus, an improved type image reproduction apparatus and an old type image reproduction apparatus can be operated together, and the improved apparatus can execute such a special command statement.

13 Claims, 11 Drawing Sheets

| ROW NO. | TIME PARAMETER | COMMAND CODE | COMMAND PARAMETER |
|---|---|---|---|
| 1 | 00:00 | START | |
| 2 | 00:00 | DRD | 0001 ON AIR /*DISPLAYED PICTURE PLANE*/ |
| 3 | 00:02 | DRD | 0002 NEXT~2b |
| 4 | 00:30 | WHR | 10 /*PWP type A 1 00:30*/ |
| 5 | 00:40 | DRD | 0003 NEXT~2b  2e |
| 6 | /*PWP type A 2 01:00*/ 2a | | |
| 7 | 01:00 | DIS | 20~2c |
| 8 | 01:50 | END | |

FIG.2

| ROW NO. | TIME PARAMETER | COMMAND CODE | COMMAND PARAMETER |
|---|---|---|---|
| 1 | 00:00 | START | |
| 2 | 00:00 | DRD | 0001 ON AIR /*DISPLAYED PICTURE PLANE*/ |
| 3 | 00:02 | DRD | 0002 NEXT |
| 4 | 00:30 | WHR | 10 /* PWP type A100:30 */ |
| 5 | 00:40 | DRD | 0003 NEXT |
| 6 | 01:00 | /* PWP type A2 01:00 */ | |
| 7 | 01:00 | DIS | 20 |
| 8 | 01:50 | END | |

FIG.8
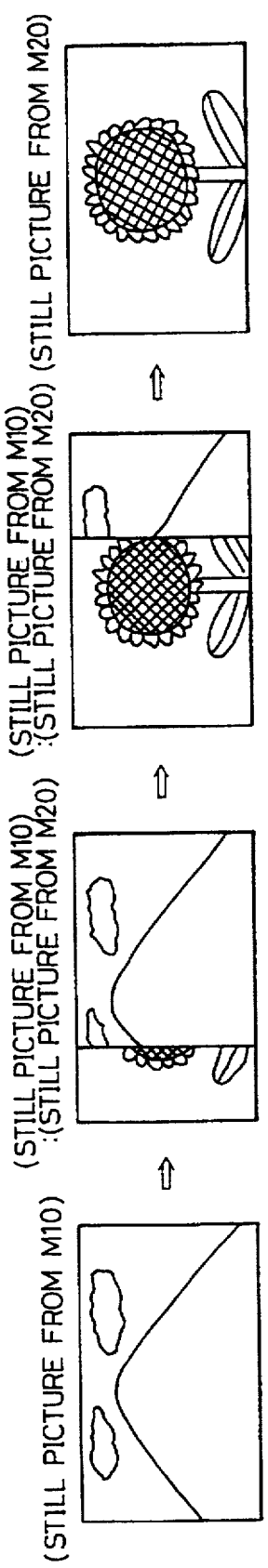
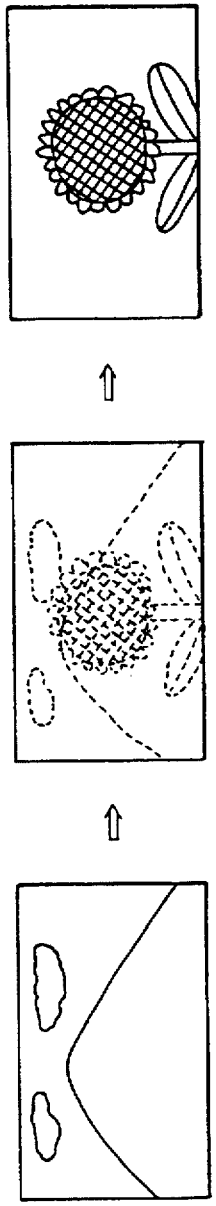

FIG.9

| ITEM | LABEL | COMMAND | PARAMETER |
|---|---|---|---|
| 1 | | DISSOLVE | VARIABLE |
| 2 | L1 | RECTANGULAR TRANSFER | VARIABLE 2, INCLEMENT/DECREMENT VALUE, VALIABLE 3, ······ |
| 3 | | LOOP | 10, L1 |
| ··· | ··· | ··· | ··· |
| N | | END | |

APPARATUS AND METHOD FOR PROGRAM EXECUTION, AND IMAGE REPRODUCTION APPARATUS WITH SPECIAL EFFECTS UTILIZING SUCH APPARATUS AND METHOD

BACKGROUND OF THE INVENTION

1. Field of the Invention

The present invention relates generally to apparatuses for program execution operating based program information read from a floppy disc or the like and methods for such program execution, and more specifically, to an image reproduction apparatus which reproduces a still picture for display and performs image effects such as wipe and dissolve at the time of switching images.

2. Description of the Background Art

Image reproduction apparatuses which sequentially display a plurality of still pictures have been used. Such an image reproduction apparatus is used for automatic exhibition of still pictures, for example, at museums, art museums or show rooms.

As one example of such an image reproduction apparatus, there is disclosed an image file apparatus in Japanese Patent Laying-Open No. 3-30176. The image file apparatus reproduces and displays image data based on control by execution of program information, and switches images by means of image effects such as scroll and wipe.

Since in an image reproduction apparatus, program information thus controls the automatic exhibition operation of the image reproduction apparatus, changing program information read into the image reproduction apparatus can readily change the automatic exhibition operation. This applies to any computer equipment which operates based on read program information besides such an image reproduction apparatus.

In such an image reproduction apparatus, when an improvement (producing an upper version) such as providing apparatus with an additional new function which has not been known before, a new program code (hereinafter referred to new code) corresponding to the improvement is set.

More specifically, a new code for a special image effect which can be achieved only with the improved version of image reproduction apparatus is additionally provided. In the improved image reproduction apparatus capable of interpreting thus added new code, when program information with the new code is executed, images can be switched by means of a special image effect.

If such program information written with the new code is executed with an old type image reproduction apparatus before the improvement, the inability of the old type image reproduction apparatus to interpret the new code causes errors or stops operation.

Accordingly, new program information described with a new code which cannot be used by the old type image reproduction apparatus cannot be used in common between the improved image reproduction apparatus and the old image reproduction apparatus.

However, use of a comment statement which will be described later enables a method of producing program information which can be used in common between the improved apparatus and the old apparatus.

Program information called "program" is generally formed of a program code statement and a comment statement. The program code statement is an instruction statement for actually operating computer equipment. The comment statement is a statement inserted to aid the producer of the program information in understanding the program code statement, irrespective of the actual operation of the computer equipment.

The computer equipment therefore ignores the comment statement in the program information, extracts the program code statement and executes an operation based on the instruction of the extracted program code statement.

As a specific example, Japanese Patent Laying-Open No. 4-216131 discloses a method of providing a program code statement with a mark designating a comment statement, thereby disabling the program code statement provided with the mark, and the technique is generally known.

The present inventors have contemplated combining a program for an improved image reproduction apparatus (hereinafter referred to as improved type program information) with program information for an old type image reproduction apparatus (hereinafter referred to as old type program), and producing program information in common including one of these pieces of program information as a comment statement. More specifically, this common program information is provided with a mark for comment statement at a portion of the old type program information when it is used at the improved type image reproduction apparatus, while the mark for comment statement is provided at a portion of the improved type program information when it is used at the old type image reproduction apparatus.

Such common program information can therefore operate in either at the improved type image reproduction apparatus or at the old type image reproduction apparatus by replacing the mark for comment statement.

If such common program information is used both at the improved type image reproduction apparatus and at the old type image reproduction apparatus, however, cumbersome replacement of the mark for comment statement was necessary.

A specific example of an image reproduction apparatus utilizing the above-described program information will be described.

A conventional image reproduction apparatus prestores a number of still pictures (A, B, . . . ). In the image reproduction apparatus, when the image is switched from still picture A to still picture B, for example, the image switching is conducted by means of an image effect such as wipe, roll, and dissolve by sequentially changing the combining ratio of still picture A and still picture B.

When "dissolve" is executed, the following control is made. When execution of the image effect "dissolve" is designated with the combining ratio of the image data a of still picture A and the image data b of still picture B being 1:0 (with still picture A being displayed), the density of image data a is reduced as the density of image data b is increased. Thus, still picture data in which image data a and image data b are mixed is formed. In this case, a still picture having still picture A and still picture B mixed therein is displayed as an image.

Finally, the combining ratio of image data a and image data b becomes 0:1 at which point the image effect "dissolve" is terminated and the displayed image is completely switched from still picture A to still picture B.

Generally in such an image reproduction apparatus one image effect is carried out first and another image effect is not carried out until the first image effect is completed. Since such an image reproduction apparatus can carry out only predetermined kinds of image effects, a special image effect cannot be achieved, and only somewhat commonplace image effect is obtained. In addition, if a special image effect e.g. executing an image effect during execution of another image effect is intended, hardware must be changed in order to execute these image effects in parallel. This therefore pushes up cost for implementing such a special image effect.

SUMMARY OF THE INVENTION

It is therefore an object of the invention to provide an apparatus and a method for program execution which permit an improved type apparatus and an old type apparatus to operate with common program information without replacing a mark for comment statement and which permit an improved type apparatus to operate according to a new code information instruction.

Another object of the invention is to provide an apparatus and a method for program execution which permit an improved type image reproduction apparatus and an old type image reproduction apparatus to operate with common program information and which permit an improved type image reproduction apparatus to operate according to a new code information instruction.

Yet another object of the invention is to provide an image reproduction apparatus which can achieve a combined special image effect by which an image is transferred during execution of an image effect without changing hardware.

A program execution apparatus according to the invention executes processings based on program information and includes a comment statement detection portion, a determination portion and a program processing portion.

The comment statement detection portion detects a comment statement from program information including a plurality of program code statements and the comment statement which correspond to part of these plurality of program code statements and can include prescribed code information. The determination portion determines the presence/ absence of the prescribed code information in the comment statement detected by the comment statement detection portion.

The program processing portion ignores a program code statement corresponding to the comment statement determined to include the prescribed code information therein by the determination portion, and executes a processing according to an instruction corresponding to the prescribed code information in the comment statement.

Accordingly, the processing according to the instruction corresponding to the prescribed code information is executed only if the prescribed code information is included in the comment statement in the program information.

Therefore, the part of the comment statement which is not executed at the old type apparatus can be executed, ignoring the program code statement corresponding to the comment statement. In that case, a new special command described as the prescribed code information in the comment statement can be carried out. Meanwhile, if the program information is used at the old type apparatus, the comment statement is not executed and therefore the processing according to the program code statement excluding the comment statement is carried out.

As a result, without replacing a mark for comment statement, the improved type apparatus and the old type apparatus can be operated with a common program and the improved type apparatus can be operated according to a new code information instruction. Stated differently, without replacing the mark for comment statement, the improved type image reproduction apparatus and the old type image reproduction apparatus can be operated with common program information, and the improved image reproduction apparatus can be operated according to a new code information instruction.

A program execution apparatus according to another aspect of the invention controls display of images by an image reproduction apparatus based on program information and includes a comment statement detection portion, a determination portion, and a program processing portion.

The comment statement detection portion detects a comment statement in program information including a plurality of program code statements and the comment statement corresponding to part of these plurality of program code statements and capable of including prescribed code information and a corresponding instruction for switching images for display by means of an image effect inherent in the image reproduction apparatus.

The determination portion determines the presence/ absence of the prescribed code information in the comment statement detected by the comment statement detection portion.

The program processing portion executes processings according to a program code statement without a corresponding comment statement and a program code statement without the prescribed code information in a corresponding comment statement, and if the determination portion determines the presence of the prescribed code information in the comment statement, a processing according to an instruction corresponding to the prescribed code information in the comment statement is executed, ignoring the program code statement corresponding to the comment statement.

Accordingly, the processing according to the instruction corresponding to the prescribed code information, in other words an instruction for switching images for display at the image reproduction apparatus is executed only if the prescribed code information is included in the comment statement in the program information.

The part of the comment statement which is not carried out in the old type image reproduction apparatus can be executed, ignoring the program code statement corresponding to the comment statement. In that case, a new special command related to switching of images for display by means of an image effect and described as the prescribed code information in the comment statement can be carried out. Meanwhile, if the program information is used with an old type apparatus, a processing according to the program code statement exclusive of the comment statement is executed, because the comment statement is not executed.

As a result, without replacing a mark for comment statement the improved type image reproduction apparatus and the old type image reproduction apparatus can be operated with common program information and the improved image reproduction apparatus can be operated according to a new code information instruction.

A program execution apparatus according to yet another aspect of the invention controls display of images at an image reproduction apparatus based on program information, and includes a comment statement detection portion, a determination portion, storage holding portion, a comparison portion and a program processing portion.

The comment statement detection portion detects a comment statement in program information including a plurality of program code statements and the comment statement corresponding to part of these plurality of program code statements and capable of including type information indicating the type of an image reproduction apparatus to which the program information is applicable and capable of including prescribed code information for switching images by means of an image effect inherent in the image reproduction apparatus.

The determination portion determines the presence/absence of the prescribed code information in the comment statement detected by the comment statement detection portion. The storage holding portion stores and holds type information about an image reproduction apparatus.

The comparison portion compares type information included in the comment statement and the type information stored and held at the storage holding portion, when the presence of prescribed code information is determined by the determination portion.

The program processing portion executes a program code statement without a corresponding comment statement, and executes a processing according to a program code statement corresponding to the comment statement if the type information compared at the comparison portion does not agree, while if the type information compared at the comparison portion agrees, the program code statement corresponding to the comment statement including the type information is ignored and a processing according to an instruction corresponding to the prescribed code information included in the comment statement is executed.

Accordingly, a new special command described in prescribed code information can be executed only if type information agrees.

Accordingly, without replacing a mark for comment statement, the improved type image reproduction apparatus and the old type image reproduction apparatus can be operated with common program information. In addition, execution of code information having different type information can be prevented, and therefore erroneous operation of the apparatus can be prevented as well.

A method of program execution according to a still further aspect of the invention executes a processing based on program information and includes the following steps.

The method includes extracting a program code statement from program information including the program code statement and a comment statement which can include prescribed code information; detecting the comment statement in the program information; if the comment statement is not detected, executing a processing according to the extracted program code statement; when the comment statement is detected, determining the presence/absence of prescribed code information in the comment statement; executing a processing according to the program code statement ignoring the comment statement in response to a detection that the comment statement does not include the prescribed code information; and executing a processing according to an instruction corresponding to the prescribed code information between the processings according the program code statement.

Accordingly, a new special command described as the prescribed code information included in the comment statement which is not executed in the old type apparatus can be inserted for execution during the processing of the program code statement. Meanwhile, when the program information is used at the old type apparatus, a processing according to the program code statement exclusive of the comment statement is executed, because the comment statement is not executed.

Thus, the improved type apparatus and the old type apparatus can be operated with common program information without replacing a mark for comment statement, and the improved apparatus can be operated according to an instruction corresponding to new code information. Stated differently, without replacing a mark for comment statement, the improved type image reproduction apparatus and the old image reproduction apparatus can be operated with common program information, and the improved type image reproduction apparatus can be operated according to an instruction corresponding to new code information.

A method of program execution according to a still further aspect of the invention executes a processing based on program information and includes the following steps.

The method includes extracting a program code statement from program information including a row of program code statement and a row of program code statement provided with a comment statement which can include prescribed code information; detecting the comment statement from the program information; executing a processing according to the program code statement for the row of program code statement having no comment statement detected; determining the presence/absence of the prescribed code information in the comment statement; executing a processing according to the program code statement exclusive of the comment statement in response to a detection that the prescribed code information is not included in the comment statement; and executing a processing according to the instruction corresponding to the prescribed code information instead of the program code statement of the row provided with the comment statement in response to a detection that the prescribed code information is included in the comment statement.

Accordingly, a special command described as the prescribed code information included in the comment statement which is not executed at the old type apparatus can be executed in place of the program code statement provided with the comment statement. Meanwhile, if the program information is used at the old type apparatus, a processing according to the program code statement exclusive of the comment statement is executed, because the comment statement is not executed.

Thus, without replacing a mark for comment statement, the improved type apparatus and the old type apparatus can be operated with common program information, and the improved type apparatus can be operated according to an instruction for new code information. Stated differently, without replacing a mark for comment statement, the improved type image reproduction apparatus and the old type image reproduction apparatus can be operated with common program information, and the improved type image reproduction apparatus can be operated according to an instruction corresponding to new code information.

A method of program execution according to a still further aspect of the invention which executes a processing based on program information includes the following steps.

The method includes extracting a program code statement from program information including a row of program code statement and a row of a comment statement which can include prescribed code information; detecting the comment statement in the program information; if the comment statement is not detected, executing a processing according to the extracted program code statement; if the comment statement is detected, determining the presence/absence of the prescribed code information in the comment statement; executing the processing according to the extracted program code statement, ignoring the comment statement in response to a detection that the prescribed code information is not included in the comment statement; executing a processing according to an instruction corresponding to the prescribed code information in place of the processing according to the program code statement of a row in a prescribed positional relation with the row of the comment statement (a row next to the comment statement, for example), in response to a detection that the prescribed code information is included in the comment statement.

Therefore, a new special command described as the prescribed code information included in the comment statement which is not executed at the old type apparatus is executed in place of the program code statement in a prescribed positional relation with the comment statement (a row next to the comment statement, for example). The processing according to the program code statement in the prescribed positional relation is not executed. Meanwhile, if the program information is used at the old type apparatus, the processing according to the program code statement exclusive of the comment statement is executed, because the comment statement is not executed.

Accordingly, without replacing a mark for comment statement, the improved type apparatus and the old type apparatus can be operated with common program information, and the improved apparatus can be operated according to an instruction corresponding to new code information. Stated differently, without replacing a mark for comment statement, the improved type image reproduction apparatus and the old type image reproduction apparatus can be operated with common program information, and the improved type image reproduction apparatus can be operated according to an instruction for new code information.

A method of program execution according to a still further aspect of the invention which executes a processing based on program information includes the following steps.

The method includes extracting a program code statement from program information including a row of program code statement and a row of comment statement which can include prescribed code information; detecting the comment statement from the program information; executing a processing according to the extracted program code statement if the comment statement is not detected; determining the presence/absence of the prescribed code information in the comment statement, if the comment statement is detected; executing the processing according to the extracted program code statement ignoring the comment statement in response to a detection that the prescribed code information is not included in the comment statement; inserting between the processings according to the instruction corresponding to the prescribed code information in the processing according to the instruction for the program code statement for execution and prohibiting execution of a processing according to a program code statement of a row in a prescribed positional relation with the row of the comment statement.

Accordingly, a new special command described as prescribed code information and included in the comment statement which is not executed at the old type apparatus can be inserted for execution during processing of the program code statement, and a processing according to an unnecessary program code statement of a row in a prescribed positional relation with the row of the comment statement can be prohibited. Meanwhile, if the program information is used at the old type apparatus, the processing according to the program code statement exclusive of the comment statement can be executed, because the processing according to the comment statement is not executed.

Therefore, without replacing a mark for comment statement, the improved type apparatus and the old type apparatus can be operated with common program information, and the improved apparatus can be operated according to an instruction for new code information. Stated differently, without replacing a mark for comment statement, the improved type image reproduction apparatus and the old type image reproduction apparatus can be operated with common program information, and the improved type image reproduction apparatus can be operated according to an instruction for new code information.

A program execution apparatus according to a still further aspect of the invention executes a processing based on program information and includes a comment statement detection portion, a determination portion, and a program processing portion.

The comment statement detection portion detects a comment statement from program information including a plurality of program code statements and the comment statement which corresponds to part of the plurality of program code statements and can include prescribed code information. The determination portion determines the presence/absence of the prescribed code information in the comment statement detected at the comment statement detection portion.

The program processing portion executes processings corresponding to a program code statement without any corresponding comment statement and a program code statement whose corresponding comment statement does not include the prescribed code information, and if the determination portion determines the presence of the code information for the prescribed code statement in the comment statement, a program code statement corresponding to the comment statement is ignored and a processing according to an instruction corresponding to the prescribed code information in the comment statement is executed.

Accordingly, the processing according to the instruction corresponding to the prescribed code information is executed only if the prescribed code information is included in the comment statement in the program information.

For a program code statement without any corresponding comment statement and a program code statement whose corresponding comment statement does not include prescribed code information, the processing according to the program code statement is executed.

Therefore, the part of the comment statement which is not executed at the old type apparatus can be executed ignoring the program code statement corresponding to the comment statement. In this case, a new special command described as the prescribed code information in the comment statement can be executed. Meanwhile, if the program information is used at the old type apparatus, the processing according to the program code statement exclusive of the comment statement is executed, because the comment statement is not executed.

Accordingly, without replacing a mark for comment statement, the improved type apparatus and the old type apparatus can be operated with common program information, and the improved type apparatus can be operated according to an instruction corresponding to new code information. Stated differently, without replacing a mark for comment statement, the improved type image reduction apparatus and the old type image reproduction apparatus can be operated with common program information, and the improved type image reproduction apparatus can be operated according to the instruction for new code information.

An image reproduction apparatus according to a still further aspect of the invention displays still picture data with a special effect and includes a storage portion, a combining portion, a display portion, a transfer portion, and a control portion.

The storage portion has a plurality of memories capable of transferring data between each other and stores still picture data in each of these memories. The combining portion combines a plurality of pieces of still picture data stored in the plurality of memories, produces image effects such as wipe, roll, and dissolve, and outputs still picture data with the image effect.

The display portion displays a still picture based on the still picture data output from the combing portion. The transfer portion transfers part of at least still picture data stored at a memory to another memory between the plurality of memories in the storage portion.

The control portion provides the transfer portion with information specifying memories which store still picture data to be combined at the combining portion as transmitting and destination memories, and controls the transfer portion so that still picture data is transferred between the memories specified with the provided information while an image in the progress of combining is being displayed at the display portion.

Therefore, when an image created by means of an image effect is displayed, an image by means of another image effect based on transfer of still picture data may be displayed. Accordingly, a special image effect can be implemented. Furthermore, the special image effect can be performed based on transfer of still picture data, without changing hardware.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a table showing program information for use in the image reproduction apparatus in FIG. 1;

FIG. 8 is a view showing a general image effect;

FIG. 9 is effect programs executed in the image reproduction apparatus in FIG. 1;

DESCRIPTION OF THE PREFERRED EMBODIMENTS

First Embodiment

Now, an image reproduction apparatus according to a first embodiment of the invention will be described in conjunction with FIGS. 1–6.

First, the first embodiment will be summarized for ease of description, and a detailed description thereof follows.

Figure 1:
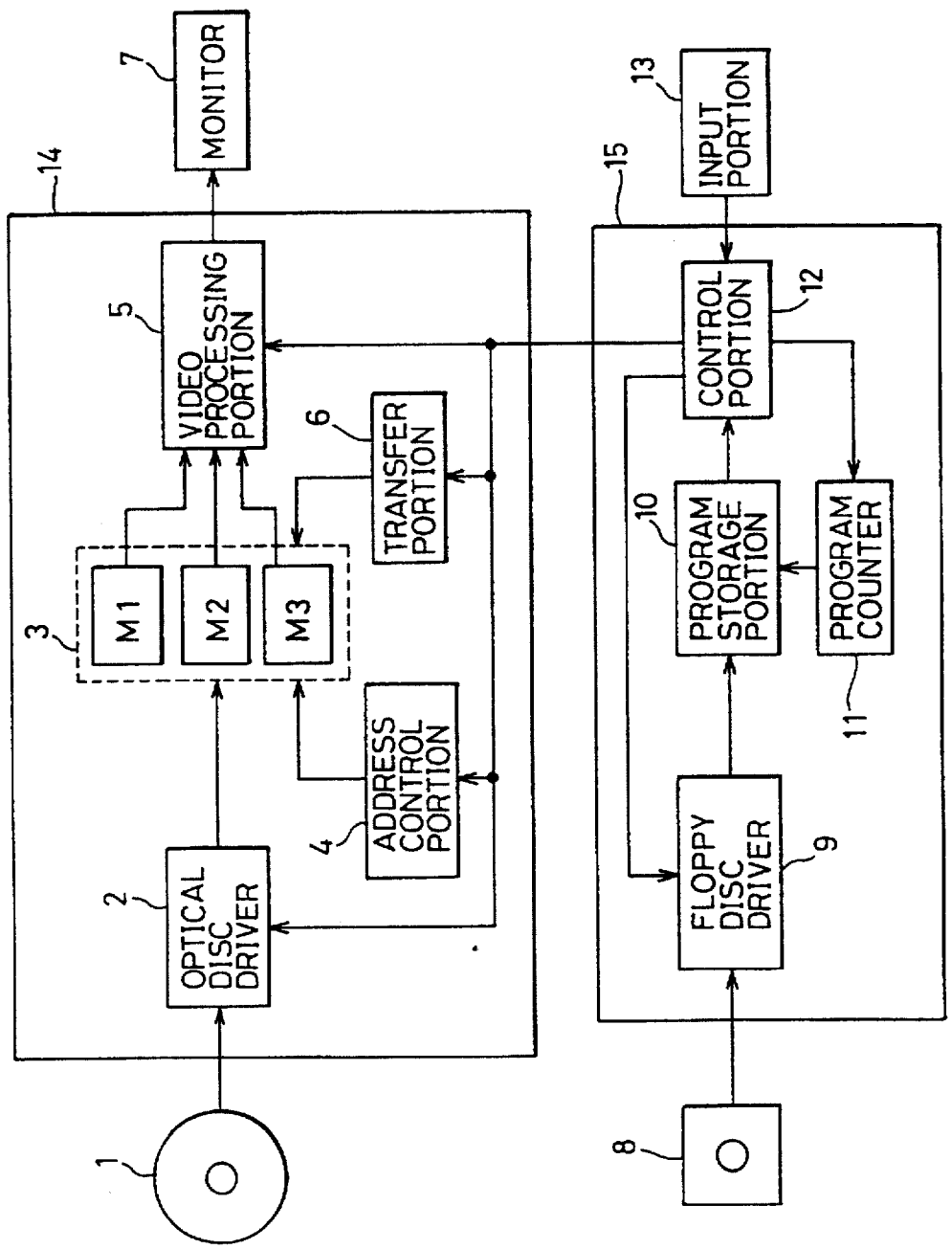
FIG. 1 is a functional block diagram showing an image reproduction apparatus according to a first embodiment of the invention.

FIG. 1 is a functional block diagram showing an image reproduction apparatus according to the first embodiment. Referring to FIG. 1, the image reproduction apparatus includes an image file apparatus 14 dealing with video signals, and a program execution apparatus 15 controlling execution of programs. These image file apparatus 14 and program execution apparatus 15 are formed of separate structures.

The image reproduction apparatus is an improved version. The image reproduction apparatus is therefore capable of interpreting new code information, a special functional command (hereinafter referred to as special command) for execution, which cannot be executed by the old type image reproduction apparatus. More specifically, the image reproduction apparatus can executes a characteristic special command PWP. Note that image file apparatus 14 and program execution apparatus 15 will be described later in detail.

FIG. 2 is a table showing program information for use in the image reproduction apparatus in FIG. 1. The program information is available in common for the improved type and the old type image reproduction apparatuses.

Referring to FIG. 2, the program information is formed of a plurality of rows of statements, each of which includes a time parameter, a command, and a command parameter. Note that they will be described later in detail.

The new code information, special command PWP is between comment statement marks "/*" and "*/". The region between these comment statement marks is the region of the comment statement. If the program information is processed with the old type image reproduction apparatus, special command PWP is processed as a comment statement and therefore will not affect execution of the program information.

Meanwhile, the image reproduction apparatus according to the first embodiment of the invention searches special command PWP in the comment statement and executes that special command PWP upon detecting it.

In addition, when special con, hand PWP in row No. 4 in FIG. 2 is executed, this special command PWP is executed in place of command WHR described in the same row for a wipe effect which has been conventionally used.

When special command PWP in row No. 6 in the program information in FIG. 2 this is executed, this special command PWP is executed in place of command DIS described in the same row for the effect of dissolve which has been conventionally used.

Thus, in the first embodiment, the new code information, special command PWP is executed only at the improved type image reproduction apparatus capable of coping with the command.

Thus, with the program information in FIG. 2, the old type image reproduction apparatus conducts a conventional execution processing ignoring the comment statement, while the improved type image reproduction apparatus executes special command PWP in the comment statement.

More specifically, the improved type image reproduction apparatus executes not only the processing according to the program code statement but also the processing according to the instruction of special command PWP in the comment statement.

Now, the first embodiment will be described in detail.

Referring to FIG. 1, the configuration of the image reproduction apparatus according to the first embodiment of the invention will be described in detail.

An optical disc 1 records still picture data. An optical disc driver 2 reproduces still picture data from optical disc 1.

Storage portion 3 is for example an image memory device formed of VRAMs, and stores still picture data reproduced at optical disc driver 2. Storage portion 3 includes three image memories M1, M2, and M3 each capable of storing one frame of still picture data. Between these image memories, still picture data is transferred through direct-memory-access transfer (hereinafter referred to as DMA transfer).

An address control portion 4 conducts a control for specifying a writing address and a reading address in storage potion 3. Specifying a writing address and a reading address by address control portion 4 executes writing/reading of still picture data to/from storage portion 3.

A video processing portion 5 processes still picture data output from one of image memories M1, M2, and M3 at storage portion 3 for conversion into a video signal.

A transfer portion 6 specifies a writing address and a reading address for DMA transfer. Storage portion 3 executes DMA transfer of still picture data between the three image memories M1, M2, and M3 based on the writing address and the reading address output from transfer portion 6.

A monitor 7 displays an image on the picture plane based on a video signal applied from video processing portion 5.

A floppy disc 8 records program information for reproduction and display of still picture data and controls such as switching of images by means of an image effect such as scroll and wipe.

The program information is formed of a number of commands as illustrated in FIG. 2, and a time parameter, a command code, and a command parameter constitute one command.

These commands are each provided with a row number, and executed on a one row basis. "/*" is a start symbol for a comment statement, and "*/" is an end symbol for a comment statement. A character string between the start symbol and the end symbol forms a comment statement.

The part other than the comment statement substantially corresponds to a program code statement for actually controlling the system of the image reproduction apparatus. More specifically, the program information is formed of a program code statement and a comment statement. A floppy disc driver 9 reproduces program information recorded on floppy disc 8. A program storage portion 10 is formed of a general-purpose memory formed of DRAMs. Program storage portion 10 stores program information reproduced by floppy disc driver 9.

A program counter 11 stores information indicating a row number to be executed, in order to specify a row of command to be executed in program information stored at program storage portion 10. Based on the information of the row number stored in program counter 11, the row number to be executed next in the program information is determined and specified.

A control portion 12 interprets the command of the row corresponding to the row number specified by program counter 11, and controls optical disc driver 2, address control portion 4, video processing portion 5, and transfer portion 6 so that an operation intended by the command is conducted at the time specified by the time parameter. Control portion 12 updates the value of row number (count value) stored at program counter 11 by 1 every time one command is executed.

An input portion 13 gives an instruction to control portion 12 and is formed of a keyboard and a mouse, for example.

Thus, image file apparatus 14 includes optical disc driver 2, storage portion 3, address control portion 4, video processing portion 5, and transfer portion 6.

Program execution apparatus 15 includes floppy disc driver 9, program storage portion 10, program counter 11 and control portion 12.

Referring to FIG. 2, the content of program information will be described in detail.

The program information shown in FIG. 2 is an automatic exhibition program specifying the order of displaying still pictures. With the program information, still pictures are automatically exhibited in monitor 7.

Now, the content of commands at the column of command codes in the program information in FIG. 2 will be described.

Command START in row No. 1 is a command indicating the start of program information.

Command DRD in row No. 2 is a command for reading out still picture data. Command DRD has as command parameters an image number 2a for designating still picture data, and picture plane information 2b for managing the picture plane of still picture data.

If picture plane information 2a indicates "ON AIR", still picture data stored at storage portion 3 is immediately video-processed at video processing portion 5 and displayed at monitor 7. If image information 2a indicates "NEXT", still picture data stored at storage portion 3 is not immediately processed. In this case, an image effect command as follows is executed for image switching processing by means of an image effect such as scroll, wipe, and dissolve, and then a resultant still picture is displayed at monitor 7.

Command WHR in row No. 4 is an image effect command switching images from a still picture in the state of ON AIR to a still picture in the state of NEXT by conducting a transverse wipe from the left to the right of the picture plane of monitor 7. Command WER has effective time 2c as a command parameter indicating time from the start of switching of images until the switching completely ends by means of transverse wipe.

Command DIS in row No. 7 is a command for an image effect for switching images from an image in the state of ON AIR to an image in the state of NEXT by means of dissolve. Command DIS has effective time 2c as a command parameter indicating time from the start of switching of images by dissolve until the switching completely ends.

A command END in row No. 8 is a command indicating the end of program information.

Special command PWP in each of row Nos. 4 and 6 is a special command characteristic of the image reproduction apparatus. Special command PWP is a command for transfer of still picture data between image memories M1, M2, and M3. More specifically, image data stored in an image memory is transferred through transfer portion 6 to another image memory storing still picture presently displayed at monitor 7 on a one-by-one basis. Finally, all the still picture data in that image memory is transferred to the image memory storing the still picture data being presently displayed.

Special command PWP is characterized by the following points. Still picture data corresponding to one line for a predetermined length and in a predetermined direction is transferred as a unit, or one rectangular area of still picture data having a predetermined size is transferred as a unit, and such transfer of still picture data is conducted on a one-by-one basis for every transfer unit.

One can see the way a still picture presently being displayed at monitor 7 is replaced with another still picture by transfer of still picture data on monitor 7 with special command PWP. The image reproduction apparatus can thus bring about a special image effect.

Special command PWP in the first embodiment is a command code, but not described as a command code. More specifically, special command PWP is described at the position between the start symbol "/*" and the end symbol "*/" as a comment statement. The comment statement having special command PWP is described with data starting from the start symbol of comment statement, special command PWP, type information 2e, image effect number 2d, operation time 2f and the end symbol of the comment statement.

Floppy disc 8 records data describing the order of transfer of data for one line or one rectangle corresponding to the image effect number. Special command PWP specifies image effect number 2d, and reproduces data corresponding to the image effect number from floppy disc 8. Switching of images with an image effect by transfer of still picture data as described above is made based on the reproduced data.

Figure 4:
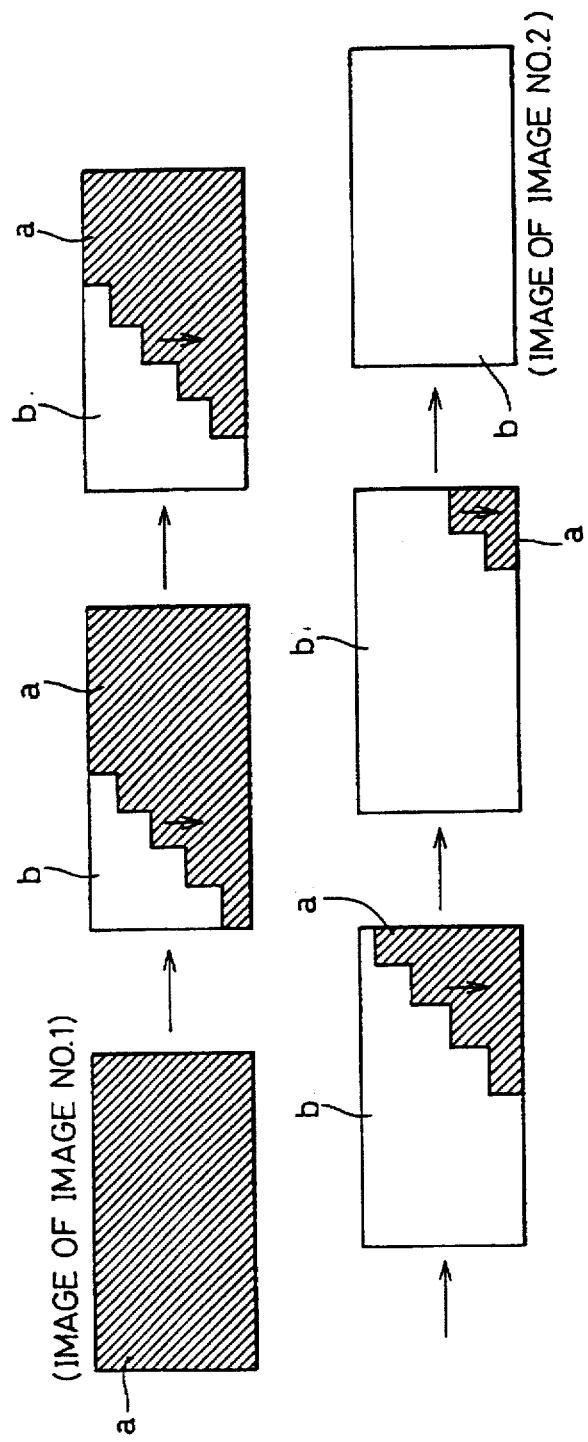
FIG. 4 is a view showing one example of image effect obtained by a special command in the program information in FIG. 2.
Figure 5:
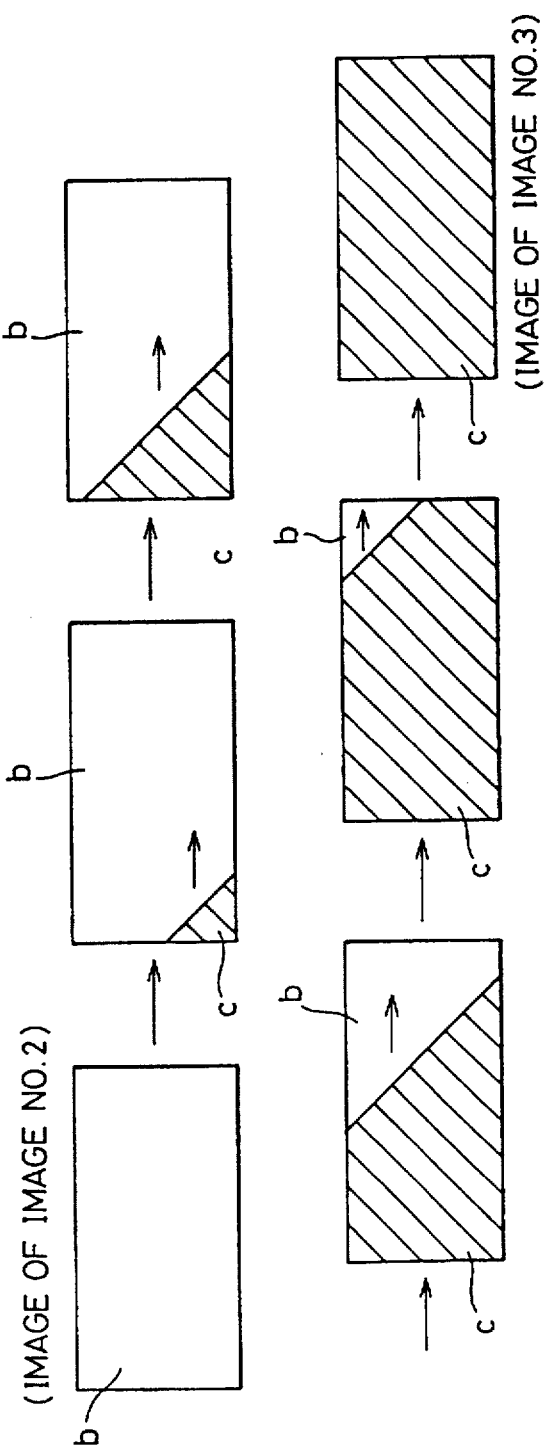
FIG. 5 is a view showing another example of an image effect obtained by a special command in the program information in FIG. 2.

Accordingly, with the image reproduction apparatus according to the first embodiment, changing data in program information recorded on floppy disc 8 can form a different image effect, and various kinds of image effects can be produced. Examples of such image effects are shown in FIGS. 4 and 5.

Type information 2e is used to identify special command PWP which can be executed at image file apparatus 14. Type information 2e is used to guarantee the execution of special command PWP at image file apparatus 14.

Now, the type information will be described in detail.

Image file apparatus 14 will be most likely to reduced in size and weight, and improved (into an upper version) with increase in operating speed and additional functions with time. If transfer portion 6 operates at an increased transfer rate, the way special command PWP switches images would change.

Accordingly, in an upper version of image file apparatus 14, a special command PWP in compliance with the type of image file apparatus 14 should be executed so that images are switched by means of the same image effect as that before such improvement. In this end, the image reproduction apparatus determines compliance between image file apparatus 14 and special command PWP based on type information.

More specifically, prescribed type information about image file apparatus 14 and the type information of special command PWP described in program information are compared for enquiry. If the comparison find a coincidence between the type information, they are matched, and otherwise they are not matched.

Figure 3:
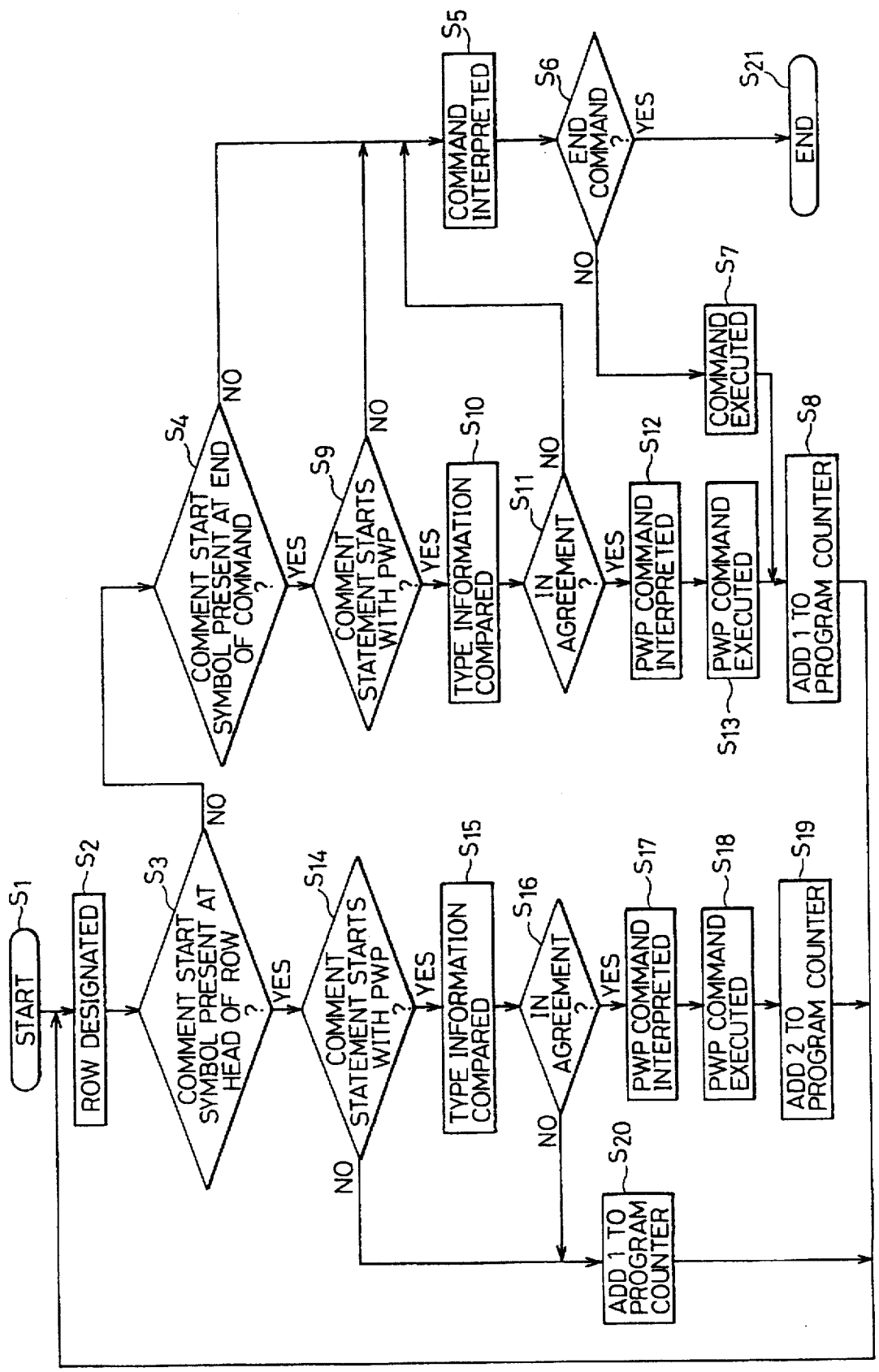
FIG. 3 is a flow chart for use in illustration of operation of a control portion based on the program information in FIG. 2.

FIG. 3 is a flow chart for use in illustration of operation control portion 12 based on the program information in FIG. 2.

Now, the operation of control portion 12 based on the program information in FIG. 2 will be described in conjunction with the flow chart in FIG. 3.

In step S1, when the operator operates input portion 13 and gives an instruction of reading program information in FIG. 2, control portion 12 instructs floppy disc driver 9 to reproduce the program information from floppy disc 8. Thus, the specified program information is read out from floppy disc 8 and stored at program storage portion 10. Control portion 12 resets the value of program counter 11 to "1".

Then in step S2, program counter 11 specifies the row number of a command to be executed among commands in the program information stored at program storage portion 10. In this embodiment program counter 11 specifies row No. 1 in this example. Accordingly, the command of row No. 1 specified by program counter 11 is output to control portion 12.

When the command of row No. 1 specified by program counter 11 is input to control portion 12, in step S3, control portion 12 determines the presence/absence of the start symbol "/*" of a comment statement at the head of the row of program information.

In step S3, if the result of determination indicates the presence of the start symbol of a comment statement at the head of the row the process proceeds to step S14, and the process otherwise proceeds to step S4.

In step S4, the presence/absence of the start symbol of a comment statement at the end of the command of row No. 1 is determined. If there is the start symbol of a comment statement at the end of the command, the process proceeds to step S9, and the process otherwise proceeds to step S5. In this embodiment with no start symbol of comment statement found at the end of the command START of row No. 1, the process proceeds to step S5.

In step S5, control portion 12 interprets the command of row No. 1. In step S6, control portion 12 determines whether or not the interpreted command is a command END. In this embodiment the command of row No. 1 is command START, not command END, and therefore the process proceeds to step S7. Then, in step S7, a timer (not shown) is reset to 00:00 (min:sec), and the processing of the program information starts.

Then, in step S8, control portion 12 adds "1" to the value of program counter 11, and the process returns to step S2. Therefore, the value of program counter 11 becomes "2", and row No. 2 is specified.

In step S2, the command of row No. 2 is specified, and the command of row No. 2 is input to control portion 12. In step S3, control portion 12 determines the absence of the start symbol of a comment statement at the head of the row as to the command of row No. 2, and then in step S4 determines the presence of the start symbol of a comment statement at the end of the command.

In step S9, control portion 12 determines whether or not the comment statement between the start symbol "/," and the end symbol "*/" is started with a prescribed character string "PWP".

In this embodiment, the comment statement in row No. 2 has a character string "display picture plane", and does not start with the character string "PWP". Accordingly, the process proceeds to step S5, and a command DRD is interpreted in step S5.

Since the command interpreted in step S5 is not command END, the process proceeds to step S7 depending upon a determination in step S6.

In step S7, the following processing is executed.

Control portion 12 controls optical disc driver 2 and address control portion 4 so that the still picture data of image No. 1 is reproduced from optical disc 1 and the reproduced still picture data is stored in image memory M1.

Control portion 12 controls address control portion 4 so as to generate a reading address, in order to read out image data stored in image memory M1.

Thus, the reproduced still picture data is stored in image memory M1 and processed at video processing portion 5 for display at monitor 7. More specifically, image memory M1 is set as an image memory for ON AIR, and still picture data stored in image memory M1 is displayed at monitor 7.

In step S8, the value of program counter 11 is updated. Program counter 11 thus specifies row No. 3.

In the processing of row No. 3, as is the case with the processing of row No. 1, processings in steps S2, S3, S4, and S5 are sequentially executed, and in step S5 command DRD is interpreted.

Since command interpreted in step S5 is not command END, the process proceeds to step S7 depending upon a determination in step S6.

Then, in step S7, control portion 12 reproduces the still picture data of image No. 2 from optical disc 1 at time 00:02 and has the same stored in image memory M2. This indicates that image memory M2 is set as an image memory for NEXT, and a still picture to be displayed next by switching of images is ready.

In step S8, the value of program counter 11 is updated. Thus, program counter 11 specifies row No. 4. Then, the processing of row No. 4 will be executed.

In the processing of row No. 4, control portion 12 sequentially executes the processings in steps S2, S3, and S4, and in step S4, determines the presence of the start symbol of a comment statement at the end of the command.

Then in step S9, control portion 12 determines whether or not the comment statement starts with the character string "PWP".

More specifically, control portion 12 compares the string of three characters described next to the start symbol of the comment statement and prestored character string "PWP". Based on the result of comparison, if the character strings are in agreement, control portion 12 determines that the comment statement starts with "PWP".

Meanwhile, if the character strings are not in agreement, control portion 12 determines that the comment statement does not start with "PWP". In this embodiment the comment statement of row No. 4 starts with "PWP", and the process proceeds to step S10.

Storage control portion 20 which will be described later (see FIG. 6) stores type information indicating the type of special command PWP executable at image file apparatus 14. In this embodiment, the stored type information is "type A".

In step S9, control portion 12 determines that the comment statement starts with "PWP". In step S10, control portion 12 compares a string of five characters (exclusive of space) next to special command PWP and the content of storage at storage holding portion 20.

Upon determining that they are in agreement in step S11 based on the result of comparison in step S10, control portion 12 makes the process proceed to step S12.

Special command PWP in this embodiment is executable at image file apparatus 14, and a processing according to special command PWP in the comment statement is executed in place of the command of an image effect executed at the old type apparatus.

Meanwhile, if it is determined that they are not in agreement in step S11, the process proceeds to step S5. Accordingly, special command PWP in this embodiment is not executable at image file apparatus 14. Therefore, in step S12, a processing according to special command PWP is not executed and a processing according to the command of an image effect executed at the old apparatus is executed.

For the row of row No. 4, a string of five characters next to special command PWP is of "type A". In step S11, control portion 12 proceeds the process to step S12 upon determining that a matching is found between the string of five characters next to special command PWP and a character string in the content stored at storage holding portion 20.

Therefore, in step S11, control portion 12 determines that the special command PWP of row No. 4 is a special command guaranteed to execute at image file apparatus 14 and interprets special command PWP in step S12.

In this embodiment control portion 12 interprets the command as a command for executing an image effect of image effect No. "1" at time 00:30.

Accordingly, in step S13, when the timer indicates the time 00:30, control portion 12 controls transfer portion 6 so that still picture data stored in image memory M2 in the state of NEXT is sequentially transferred on a one rectangular area basis to image memory M1 in the state of ON AIR. The transfer continues until all the still picture data is transferred.

As a result, on monitor 7, by the special image effect as illustrated in FIG. 4, the image is switched from the still picture of image No. 1 to the still picture of image No. 2.

FIG. 4 is a view showing how images are switched by means of an image effect according to special command PWP. Referring to FIG. 4, the image displayed changes with time in the order indicated by the arrow in FIG. 4. The displayed image is thus switched from the first still picture a to the second still picture b.

Then control portion 12 updates image memory M2 from the state of NEXT to the state of ON AIR. Then, control portion 12 increments the value of program counter 11 by "1" and designates row No. 5.

Accordingly, in the processing of row No. 4, command WHR which should be originally processed is ignored, and the processing according to special command PWP i.e. a comment statement is executed in place of command WHR.

More specifically, in the processing of row No. 4, control portion 12 detects the comment statement, and determines that the detected comment statement starts with "PWP". Control portion 12 upon determining a matching between the type information of image file apparatus 14 and the type information of special command PWP, replaces command WHR which should be originally processed with special command PWP and executes a processing according to special command PWP.

The processing of row No. 5 is executed.

In the processing of row No. 5, control portion 12 sequentially processes steps S2, S3, S4, S5, S6, and S7 as is the case with row No. 3, reproduces the image data of row No. 3 at time 00:40 from optical disc 1 and has the reproduced data stored in image memory M3. Thus, image memory M3 becomes an image memory for NEXT.

In step S8, the value of program counter 11 is updated, and program counter 11 designates row No. 6.

In step S2, the command of row No. 6 designated by program counter 11 is input to control portion 12. In step S3, control portion 12 determines the presence of the start symbol of a comment statement at the head of the row.

In step S14, control portion 12 determines the presence/absence of a character string "PWP" following the start symbol of the comment statement. Based on the result, the process proceeds to step S15 if the comment statement starts with "PWP", and the process otherwise proceeds to step S20.

In the case of row No. 6, the comment statement starts with "PWP", and therefore the process proceeds to step S15.

In step S15, type information corresponding to a string of five characters (exclusive of the space) next to special command PWP and type information (type A) in the content stored at storage holding portion 20 are compared. Upon determining a matching between the type information in step S16 based on the result of comparison in step S15, control portion 12 proceeds the process to step S17.

In this embodiment, special command PWP is executable at image file apparatus 14, and therefore a processing according to special command PWP in the comment statement is executed in place of the command of an image effect which should originally be executed.

Meanwhile, upon determining that no matching is found between the type information in step S16, control portion 12 proceeds the process to step S20.

Accordingly, in this embodiment, special command PWP is not executable at image file apparatus 14, therefore a processing according to special command PWP is not executed, and a processing according to the command of an original image effect is executed instead.

In the case of row No. 6, the string of five characters next to special command PWP is "type A". Accordingly, control portion 12 determines that a matching is found between the string of five characters next to special command PWP and the character string in the content stored at storage holding portion 20, and transits the process to step S17.

Therefore, control portion 12 determines that the special command PWP of row No. 6 is a special command PWP guaranteed to be executed at image file apparatus 14. Control portion 12 interprets special command PWP in step S17.

In the case of row No. 6, control portion 12 interprets the command as a special command PWP for executing the image effect of image effect No. 2.

When the timer indicates time 01:00, control portion 12 controls transfer portion 6 so that still picture data stored at image memory M3 in the state of NEXT is sequentially transferred by one line as a unit to image memory M2 in the state of ON AIR. The transfer continues until all the still picture data is transferred.

As a result, the image is switched from the still picture of image No. 2 to the still picture of image No. 3 by means of the special image effect as illustrated in FIG. 5.

FIG. 5 is a view showing how images are switched by means of an image effect according to a special command PWP. Referring to FIG. 5, the image displayed changes with time in the order indicated by the arrow. The displayed image thus switches from the second still picture b to the third still picture c.

In step S19, control portion 12 increments the value of program counter 11 by "2" and sets the value to "8", and the process proceeds to step S2. More specifically, row No. 8 is set as a row to be executed next.

Thus, command DIS at row No. 7 which is the row next to special command PWP is ignored, and a processing according to special command PWP immediately before is executed in place of command DIS.

In step S2, upon receiving the command of row at row No. 8 designated by program counter 11 as input, control portion 12 sequentially executes processings in steps S3, S4, and S5, and interprets the command in step S5.

In this embodiment, control portion 12 interprets row No. 8 as command END. In step S6, control portion 12 determines whether or not the interpreted command is command END.

In the case of row No. 8, since the interpreted command is command END, at time 1:50 control portion 12 moves the process to step S21 and ends execution of the program information.

Thus, a special command characteristic of image file apparatus 14 is described in a comment statement in program information, an if a matching is found between type information in the special command and image file apparatus 14, a processing according to the command of an image effect which should be originally executed is ignored, and a processing according to special command PWP is executed.

If a special command PWP characteristic of image file apparatus 14 is described in a comment statement in program information and a matching is not found between type information in special command PWP and image file apparatus 14, program processing apparatus 15 executes a processing according to the command of an original image effect instead of a processing according to the special command.

Figure 6:
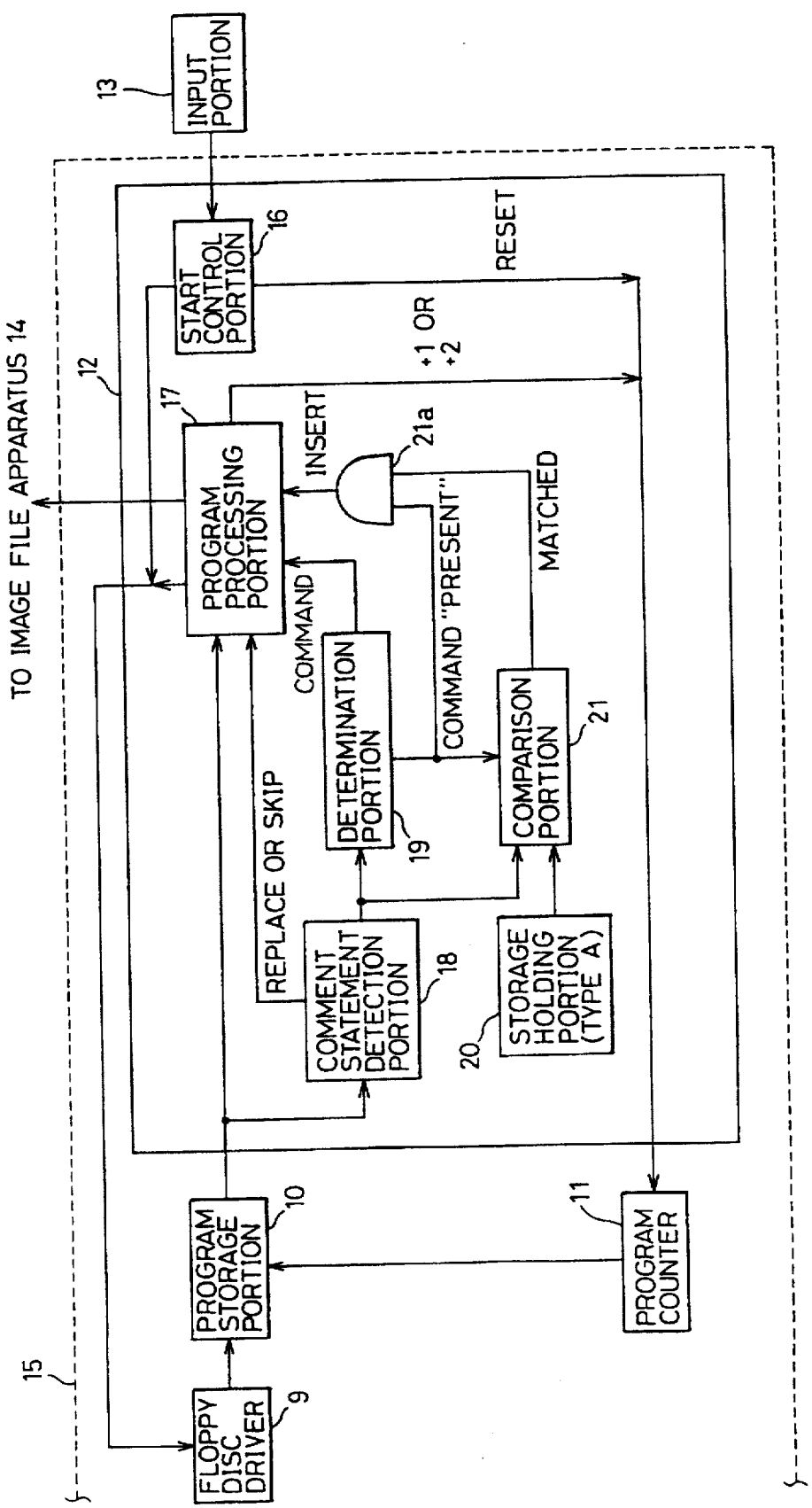
FIG. 6 is a functional block diagram showing a control portion.

The operation of control portion 12 has been described in conjunction with the flow charts. Now, the structure and operation of control portion 12 will be described in conjunction with FIG. 6. FIG. 6 is a functional block diagram of control portion 12. Note that in FIG. 6 the same portions as those in FIG. 1 are designated with the same reference characters and a description thereof is omitted.

Control portion 12 includes a start control portion 16, a program processing portion 17, a comment statement detection portion 18, a determination portion 19, a storage holding portion 20, a comparison portion 21, and an AND circuit 21a.

Start control portion 16 instructs a floppy disc driver 9 to reproduce program information in response to an instruction to read the program information from an input portion 13. Start control portion 16 resets the value of program counter 11 to "1".

Program processing portion 17 usually extracts a program code statement ignoring a comment statement in the input program information, and executes a processing according to the program code statement. Thus, program processing portion 17 controls image file apparatus 14 and floppy disc driver 9. Program processing portion 17 outputs a signal for updating the value of program counter 11 by 1 every time one command is executed.

Program processing portion 17 inserts an instruction corresponding to a command applied from determination portion between the extracted program code statement for execution, in response to an input signal (hereinafter referred to as insertion signal) from AND circuit 21a.

Comment statement detection portion 18 detects the presence/absence of a comment statement in the input program information, and extracts the comment statement for output to determination portion 19 if the comment statement is present.

Comment statement detection portion 18 detects the position where the comment statement is described, and outputs a signal in response to the position to program processing portion 17. Comment statement detection portion 18 outputs a replacement instruction signal if the detected comment statement is at the end of the row, and outputs a skip instruction signal if the comment is at the end of the row.

Determination portion 19 determines the presence/absence of a special command PWP in the comment statement detected by comment statement detection portion 18. If special command PWP is present in the comment statement, special command PWP is output to program processing portion 17. Determination portion 19 outputs a signal "present" to comparison portion 21 and AND circuit 21a if special command PWP is present.

Storage holding portion 20 stores type information corresponding to image file apparatus 14 of an improved type, and stores type information "type A" in this embodiment.

Upon receiving the signal "present" input from determination portion 19, comparison portion 21 compares type information in the comment statement from comment statement detection portion 18 and the type information stored at storage holding portion 20. Comparison portion 21 outputs a matching signal if a matching is found between the type information.

AND circuit 21a outputs an insertion signal to program processing portion 17 only if the signal "present" is input from determination portion 19 and the matching signal is input from comparison portion 21.

Now, the operation will be described.

Program processing portion 17 usually extracts a program code statement ignoring a comment statement as described above, and executes a processing according to the instruction of the extracted program code statement.

Now, the case in which program information row No. 4 shown in FIG. 2 is input to control portion 12 will be described. In this case, comment statement detection portion 18 detects the comment statement. Comment statement detection portion 18 outputs the detected comment statement to determination portion 19 and comparison portion 21. Comment statement detection portion 18 outputs a replacement instruction signal to program processing portion 17, because the comment statement is at the end of the row.

Determination portion 19 determines the presence/absence of a special command PWP in the comment statement. In this case, since special command PWP is present, determination portion 19 outputs a signal "present" to comparison portion 21 and AND circuit 21a.

Upon receiving the signal "present" input from determination portion 19, comparison portion 21 compares type information "type A" in the comment statement from comment statement detection portion 18 and type information "type A" from storage holding portion 20, and outputs a matching signal based on the result of comparison.

AND circuit 21a outputs an insertion signal to program processing portion 17 in response to input of the signal "present" from determination portion 19 and the matching signal from comparison portion 21. Thus, program processing portion 17 is provided with the insertion signal input from AND circuit 21a.

Program processing portion 17 checks the kind of the signal provided from comment statement detection portion 18, in response to input of the insertion signal. In this case, the kind of the signal is a replacement instruction signal, and therefore command "PWP 1 00:30" applied from determination portion 19 is executed without executing a processing according to command "00:30 WHR 10" in row No. 4 which should originally be executed. Program processing portion 17 outputs a signal for updating the value of program counter 11 by 1.

Now, the case in which program information row No. 6 in FIG. 2 is input to control portion 12 will be described. The operation in this case is substantially the same as the operation in the case of row No. 4 described above, and therefore only different operation portions will be described.

Comment statement detection portion 18 outputs a skip instruction signal to program processing portion 17, because the comment statement of row No. 6 is at the start of the row.

The operation otherwise proceeds the same as the case of row No. 4 described above, and program processing portion 17 is provided with an insertion signal input from AND circuit 21a.

Program processing portion 17 checks the kind of a signal provided from comment statement detection portion 18 in response to input of the insertion signal. The kind of the signal is a skip instruction signal. Since the row of row No. 6 consists only of a comment statement, and therefore there is not any such command which should be originally executed. Program processing portion 17 executes a processing according to command "PWP 2 01:30" from determination portion 19.

Program processing portion 17 outputs a signal for updating the value of program counter 11 by "2". Row No. 7 is therefore not read out. That is, a processing according to special command PWP in the comment statement of row No. 6 is executed in stead of command of row No. 7.

As described above, according to the first embodiment, without replacing a mark for comment statement, the improved type image reproduction apparatus and the old type image reproduction apparatus can be operated with a common program, and the improved image reproduction apparatus can operate according to a new special command PWP.

In addition, according to the first embodiment, since a matching is determined between the type information of image file apparatus 14 and the type information of special command PWP, and a processing according to special command PWP is executed only if the type information agree, a processing according to a special command PWP which does not agree in type information with image file apparatus 14 is not executed. Accordingly, erroneous operation attributable to mismatching between the special command and the image file apparatus can be prevented.

Furthermore, according to the first embodiment, program information including prescribed code information, i.e. special command PWP in its comment statement can be inserted between an instruction according to a usual program code statement and a processing based on the special command can be executed.

When program information including prescribed code information, special command PWP in its comment statement is executed, a processing according to special command PWP is automatically executed in place of the instruction of conventionally existing program code statement, and therefore unnecessary program code statements due to use of the special command PWP does not have to be separately deleted or invalidated.

Note that in the first embodiment, image file apparatus 14 and program processing portion 15 are separately structured, but the invention is not limited to such a structure, and image file apparatus 14 and program processing apparatus 15 may be integrated.

In the first embodiment, the special command characteristic of image file apparatus 14 is PWP in the above description, but the invention is not limited thereto and any command characteristic of image file apparatus 14 may be used. Any other novel special command which can be added with an improved type image reproduction apparatus may be used, or alternatively preexisting commands may be used.

In the first embodiment, special command PWP is always executed in place of a command conventionally existing, the invention is not limited thereto and special command PWP may be simply inserted between preexisting commands for execution. Special command PWP at the end of a row is replaced with a conventionally existing command, but special command PWP at the start of a row does not have to be replaced with a conventionally existing command in the next row.

More specifically, in the first embodiment, the value of program counter 11 is updated by "2" for special command PWP located at the start of the row, but the value of program counter 11 may be changed by "1" in such a case.

In this embodiment, the start symbol of a comment statement is "/*", and the end symbol is "*/", the invention is not limited thereto and any start and end symbols may be employed for a comment statement as long as they can specify the comment statement.

In the first embodiment, the character string "PWP" is described at the head of a comment statement in the above description, the character string is not limited to "PWP" and the position is by no means limited to a prescribed position of a comment statement (head, for example). More specifically, a special character string indicating execution of a special command characteristic of image file apparatus 14 needs only be described at a place in a comment statement.

In the first embodiment, still picture data is recorded on optical disc 1, and program information is recorded on floppy disc 8 in the above description, but the invention is not limited thereto and these still picture data and program information may be recorded on the same recording medium. Recording media for recording still picture data and program information are not limited to optical disc 1 and floppy disc 8, and hard disks or the like may be employed.

In the description of the first embodiment in conjunction with FIG. 3, the processings in steps S10, S11, S15, and S16 are executed in order to find a matching between the type information of image file apparatus 14 and the type information of special command PWP, but the above-described processings may be omitted by all means, provided that program information is processed based on a matching found between the type information of image file apparatus 14 and the type information of special command PWP.

In the description of the first embodiment in conjunction with FIG. 6, although storage holding portion 20, comparison portion 21, and AND circuit 21a are provided in order to find a matching between the type information of image file apparatus 14 and the type information of special command PWP, these means may be omitted, provided that program information is processed based on a matching found between the type information of image file apparatus 14 and the type information of special command PWP. In that case, the signal "present" for a command may be used as an insertion signal.

Each component of the image reproduction apparatus according to the first embodiment may be formed of software or hardware as desired. It goes without saying that the present invention includes both configurations.

It should be noted that the first embodiment has been described simply by way of illustrating the present invention, various modifications may be possible as desired, and the invention recited in the scope of claims includes all of such modifications.

Second Embodiment

Now, a second embodiment of the invention will be described. In the second embodiment, an image reproduction apparatus for implementing more special image effects by transferring still picture data while execution of an image effect such as wipe, roll, and dissolve are in progress will be described.

Figure 7:
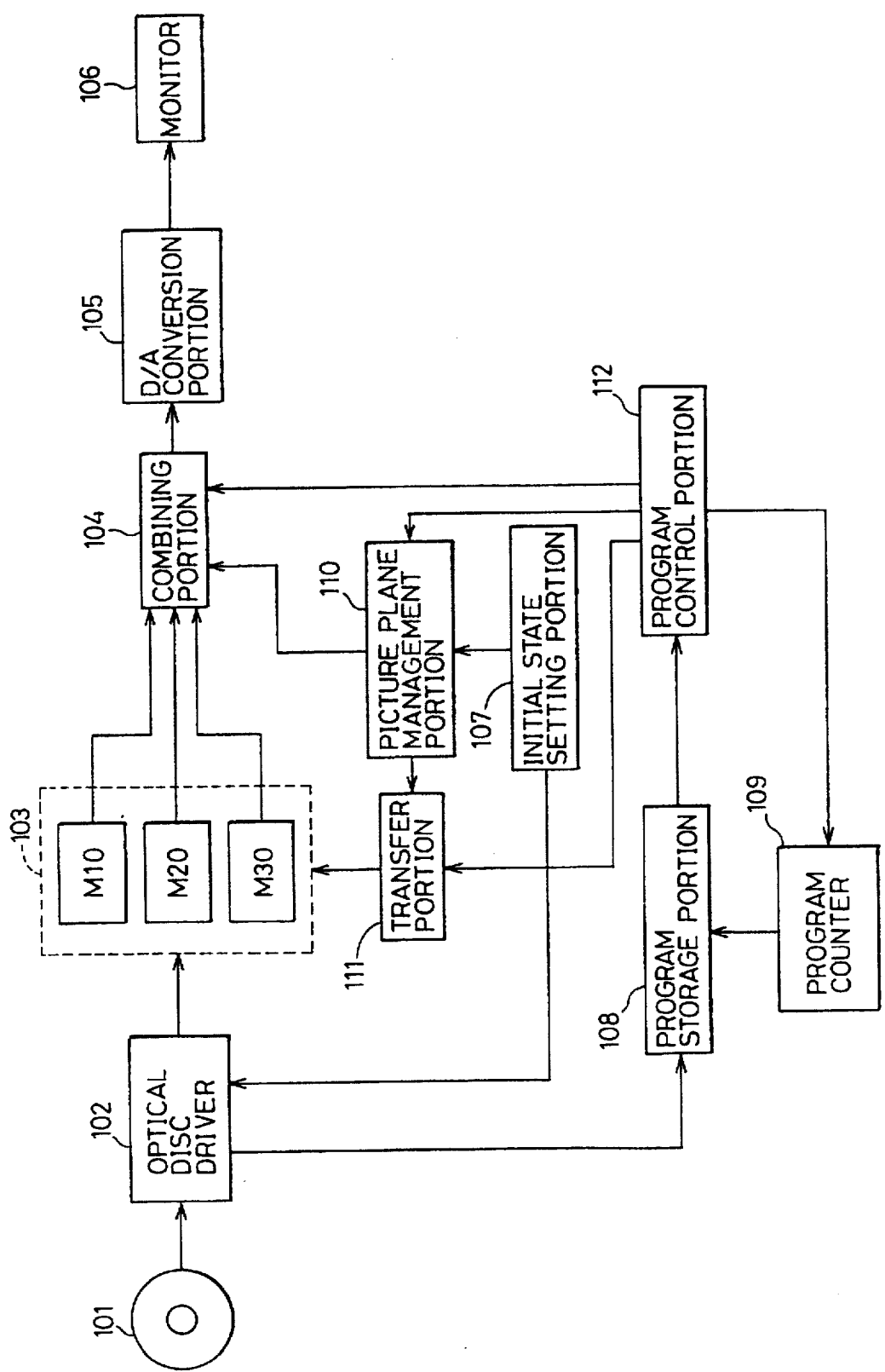
FIG. 7 is a functional block diagram showing an image reproduction apparatus according to a second embodiment of the invention.

FIG. 7 is a functional block diagram showing an image reproduction apparatus according to the second embodiment.

Referring to FIG. 7, an optical disc 101 records still picture data and effect programs. The effect program is as will be described later intended to control execution of an image effect such as wipe, roll, and dissolve and execution of still picture data transfer.

The recording region of optical disc 101 has an image data portion for recording still picture data, and an effect data portion for recording effect programs. In addition, the image data portion is divided into a plurality of image data areas, and the effect data portion is divided into a plurality of effect data areas as well.

One image data area of the plurality of image data areas records one piece of still picture data. Similarly, one effect data area of the plurality of effect data areas records one effect program. The image data areas and effect data areas are provided with numbers in the order of addresses. These numbers correspond to numbers for designating still picture data and the effect programs.

Optical disc 101 records directory information recording the addresses of the heads of each image data area and each effect data area. In addition, optical disc 101 records volume information such as date of production, disc identity information, and information about various flags. Accordingly, designating a number for still picture data and a number for an effect program specifies data areas where they are recorded in optical disc 101. In addition, in optical disc 101, recorded data in each data area can be accessed by referring to the directory information.

Note that there are various kinds of optical disks such as a type permitting additional recording and a type permitting replacing by erasing storage contents, and any type of disc may be used for optical disc 101 as long as stored contents can be reproduced therefrom.

An optical disc driver 102 controls reproduction from optical disc 101 and reads out still picture data and an effect program therefrom. A reproduced still picture is stored in a storage portion 103. A reproduced effect program is stored in a program storage portion 108.

Storage portion 103 stores still picture data. Storage portion 103 has three memories M10, M20, and M30. Each of these memories M10 to M30 stores only one frame of still picture data. Accordingly, storage portion 103 can store three frames of still picture data all together.

A combining portion 104 selects two of memories M10, M20, and M30, and combines still picture data stored in the selected two memories based on a combining ratio as follows. Combining portion 104 outputs data corresponding to one frame of the combined still picture data to a D/A conversion portion 105.

An example of an image effect obtained by combining still picture data at combining portion 104 will be described. FIG. 8 is a view showing the states of a transverse wipe effect and a dissolve effect.

The transverse wipe effect will be described. Herein, switching of images by means of a transverse wipe effect (wipe effect from the left to right of the picture plane) from the image of still picture data in memory M10 to the image of still picture data in memory M20 will be described. The upper part of FIG. 8 illustrates the transverse wipe effect. Referring to FIG. 8, assume that still picture data stored in memory M10 and still picture data stored in memory M20 are combined in the ratio of 1 to 0, and that the still picture data in memory M10 is described at monitor 106.

The display region (the ratio) of still picture data from memory M10 on the picture plane is progressively reduced as a function of increase of the display region (the ratio) of the still picture data in memory M20 on the picture plane.

Accordingly, the transverse wipe effect by which the joint between the still picture data in memory M10 and the still picture in memory M20 moves from the left to the right is implemented. When the combining ratio of the still picture data of memory M10 and the still picture data of memory M20 becomes 0 to 1, the images completely switch and the transverse wipe effect ends.

Now, the dissolve effect will be described. Herein, the case will be described in which images are switched by means a dissolve effect from the still picture data of memory M20 to the still picture data of memory M30.

The lower part of FIG. 8 illustrates the dissolve effect. Referring to FIG. 8, the still picture data stored in memory M20 and still picture data stored in memory M30 are combined in the ratio of 1 to 0, and the still picture data of memory M20 is displayed at monitor 106.

The pixel density (combining ratio) of the entire still image data stored in memory M20 is progressively decreased as a function of increase of the pixel density of the entire still picture data stored in memory M30.

The dissolve effect is thus implemented by which the entire still picture data in memory M20 gradually fades on the picture plane, while the entire still picture data in memory M30 gradually rises onto the picture plane. At the point where the combining ratio of the still picture data of memory M20 and the still picture data in memory M30 is 0 to 1, the images are completely switched and the dissolve effect is completed.

D/A conversion portion 105 converts one frame of combined still picture data output by combining portion 104 for output to a monitor 106.

Monitor 106 displays the still picture data based on the analog signal obtained from D/A conversion portion 105.

Effective pixels which can be displayed on the picture plane are 1035 pixels in the vertical direction and 1920 pixels in the horizontal direction.

An initial state setting portion 107 outputs to optical disc driver 102 a disc number given to an effect program to be executed. In addition, a number given to a memory whose data is being presently displayed at monitor 106 and a number given to a memory to be displayed next are output to a picture plane management portion 110. Initial state setting portion 107 may designate an initial state as a parameter for an execution program different from an effect program.

A program storage portion 108 stores an effect program execution of which is designated by initial state setting portion 107 and which is then reproduced by optical disc driver 102. The effect program reproduced in this case is an effect program in binary expression which can be easily treated by a computer. More specifically, execution of an effect program is based on an effect program of binary expression.

A program counter 109 sequentially designates execution commands in an effect program. Program counter 109 receives input information that a command to be executed enters a stage of execution from a program control portion 112 which will be described later. In this case, program counter 109 increments/decrements the value of program counter 109 in order to designate a command to execute next.

Picture plane management portion 110 manages the picture plane based on a number given to a memory storing still picture data being presently displayed at monitor 106 and a number given to a memory storing still picture data to be displayed next. More specifically, picture plane management portion 110 sets the memory whose data being presently displayed as memory ON AIR, a memory whose data is to be displayed next as memory NEXT, and a memory whose data is to be displayed next to NEXT as memory SECOND NEXT.

Picture plane control 110 provides a management table having information have these ON AIR, NEXT, and SECOND NEXT and memory No. (M1, M2, M3) in storage portion 103 in association with each other for picture plane control.

More specifically, in picture plane management portion 110, a memory storing still picture data being presently displayed is recorded as memory ON AIR in the management table. A memory whose still picture data is to be displayed next is recorded in the management table as memory NEXT. Memories storing the remaining still picture data are recorded in the management table as memories SECOND NEXT.

Upon receiving input information indicating a combining command such as wipe, dissolve, and roll by which an image effect is obtained by combining still picture data at combing portion 104 from program control portion 112 which will be described later, picture plane management portion 110 outputs the memory number of ON AIR and the memory number of NEXT to combining portion 104.

Accordingly, combining portion 104 combines still picture data stored in the memory ON AIR and still picture stored in the memory NEXT in the above-described manner. Thus, the images are switched on monitor 106.

Picture plane management portion 110 outputs the memory number of ON AIR and the memory number of NEXT to combining portion 104, and then updates the management table. More specifically, the number of ON AIR is registered as SECOND NEXT. The memory number of NEXT is registered as ON AIR. The memory number of SECOND NEXT is registered as NEXT.

Picture plane management portion 110 always outputs the memory number of ON AIR and the memory number of NEXT to combining portion 104, updates the management table, rotates memories to be displayed, and thus switches images one after another on monitor 106.

Picture plane management portion 110 also manages transfer of image data between memories M10, M20, and M30. Upon receiving input memory information for ON AIR, NEXT, and SECOND NEXT designating memories to/from which data is transferred among parameters for transfer commands for transferring images from program control portion 112, picture plane management portion 110 outputs a memory number necessary for transfer of still picture data to transfer portion 111 by referring to the above-described management table.

If ON AIR is registered as "M10" in the management table, NEXT as "M20", and SECOND NEXT as "M30", while information at a memory to which data is transferred is SECOND NEXT and information at a memory from which data is transferred is ON AIR, memory number M30 is output as information from a destination to transfer portion 111 and memory number M10 is output as information from a transferring memory.

Transfer portion 111 receives transfer commands and parameters for transferring still picture data (coordinates of a destination, transfer size, coordinates of a transferring memory), and the memory numbers of the destination and the transferring memory from picture plane management portion 110. Transfer portion 111 transfers an image from a memory corresponding to the transferring position in storage portion 103 to a memory corresponding to the destination in storage portion 103.

Note that the area whose still picture data is transferred at a time is not limited to a line or a rectangle. The size of the area transferred at a time may be not only part of still picture data but also the entire still picture data (corresponding to 1 frame).

Now, program control portion 112 will be described together with an effect program. The effect program will be described first.

The effect program describes the order in which an image effect such as wipe, dissolve, and roll at combining portion 104 and transfer of still picture data at transfer portion 111 are executed.

An image effect is controlled for execution based on the effect program. In addition, based on the effect program, during an image effect execution in progress, still picture data is transferred between memories used for that image effect.

Accordingly, execution of an image effect such as wipe, dissolve, and roll and transfer of still picture data based on such an image effect program are combined together on the picture frame displayed at monitor 106 and implements a combined special image effect is implemented.

An effect program has an effect data area. The effect data area is divided into a header portion, a variable initial value portion, and a program portion.

The header portion recording address and data size of an image data area to be executed next.

The variable initial value portion records information for specifying coordinates and memories necessary for transfer of still picture data or the like as initial values for variables corresponding to these information. The variable initial value portion stores a variable and a corresponding initial value in correspondence. Each of the initial values is stored on a 2-bite basis from the head of the variable initial value portion. Accordingly, if execution of an effect program is initiated, the variable initial value portion is referred to in order to obtain a necessary initial value corresponding to a variable in the parameter of each command.

The program portion is a region for recording effect programs.

FIG. 9 is a table showing the content of an effect program. The program portion is formed of commands and parameters as illustrated in FIG. 9. Each parameter is formed of variables and constants.

Now, each item of the effect program in FIG. 9 will be described.

Referring to FIG. 9, item 1 is a dissolve command for specifying execution of the above-described dissolve effect. The dissolve command has a variable (variable 1) specified for effective execution time as a parameter.

Item 2 is a rectangular transfer command. Specified as parameters corresponding to the rectangular transfer command are transfer destination information including coordinates (variable 2, variable 3) at the starting point of a rectangular region at a transfer destination, sizes in vertical and horizontal directions (variable 4, variable 5) and memory information (variable 6, one of ON AIR, NEXT, and SECOND NEXT), transferring side information including coordinates (variable 7, variable 8) in a rectangular region at the place from which data is transferred and memory information (variable 9). Furthermore, as parameters corresponding to the rectangular transfer command, increment/decrement values are specified as constants for coordinates at the starting point of the rectangular region at the transfer destination, sizes in the vertical and horizontal directions and the initial point coordinates of the rectangular region at the place from which data is transferred.

Item 3 is a loop command. Specified as constants for parameters corresponding to the loop command are how many times the process loops (hereinafter referred to as a loop number) and a label number. In addition, in the loop command, a label number is set for a command (the rectangular transfer command in item 2) to be a loop destination (branch destination). Item N is an end command. When the end command is executed, execution of an effect program is completed.

The operation of program control portion 112 executed based on the above-described effect program will be described.

Program control portion 112 interprets a command specified by program counter 109 (hereinafter referred to as execution command) and parameters corresponding to the execution command in order to control of execution manners. If a combining command such as wipe, dissolve, and roll for producing an image effect by combining at combining portion 104 is specified among execution commands, the combing ratio is output to combining portion 104, and information indicating the combining command is output to picture plane management portion 110.

Furthermore, if a transfer command for transferring still picture data is specified among execution commands, memory information (ON AIR, NEXT, and SECOND NEXT information) among transfer destination information and transferring side information is output to picture control portion 110, and the remaining coordinates and size information are output to transfer portion 111.

The operation of program control portion 112 when at initial state setting portion 107, memory M1 is set to the ON AIR, memory M2 is set to NEXT, and memory M3 is set to NEXT SECOND for execution of an effect program will be described in conjunction with a flow chart in FIG. 10.

Figure 10:
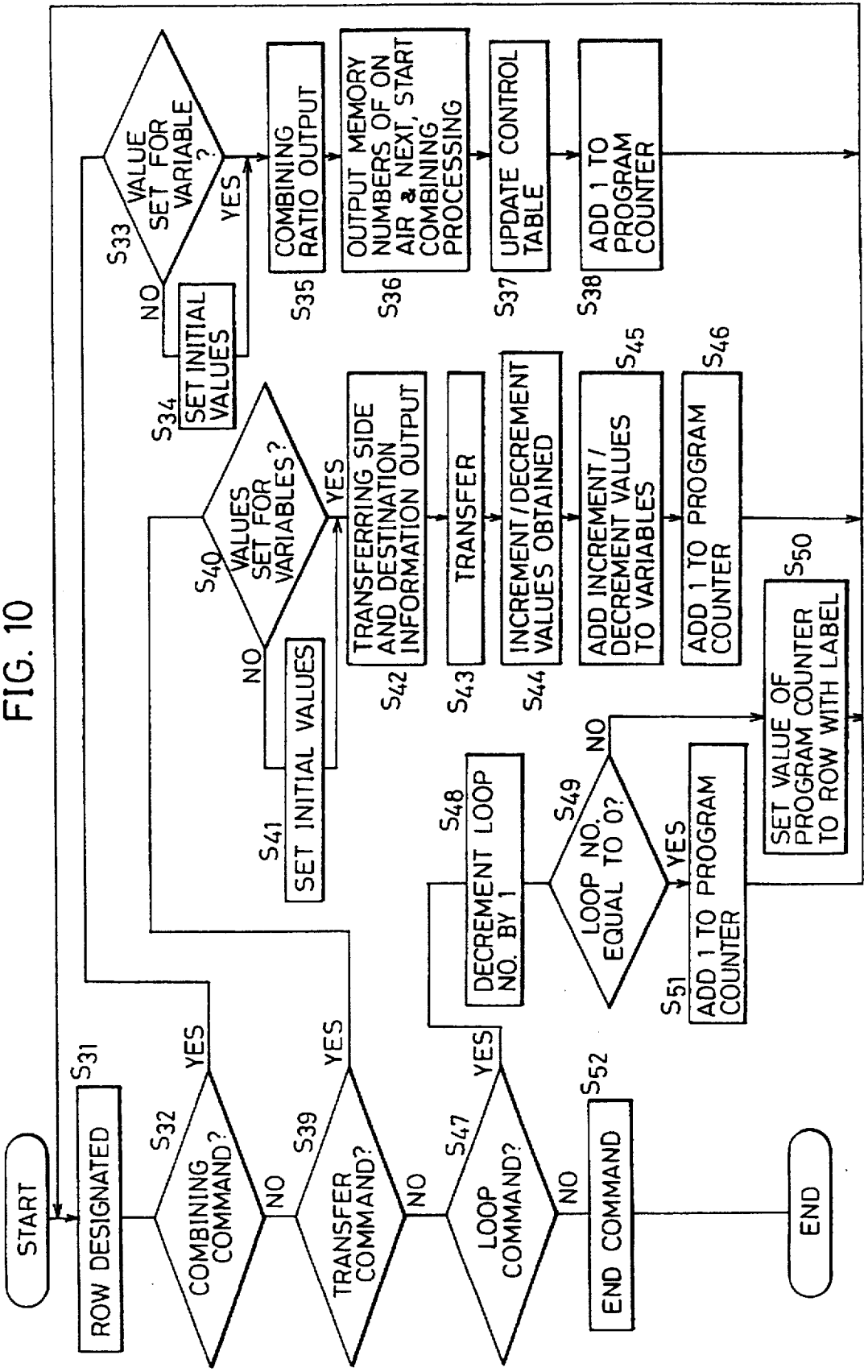
FIG. 10 is a flow chart for use in illustration of operation of the program control portion in FIG. 1.

Referring to FIG. 10, as shown in step S31, in response to a designation of a row by program counter 109, it is determined whether or not the command of the designated row is a combining command as illustrated in step S32. In this case, if the dissolve command in item 1 is designated, since the command is a combining command, the process proceeds to step S33.

In step S33, it is determined whether or not a value is set for a variable corresponding to the command. If it is determined that any value is not set, an initial value is set for the variable in step S34. This is conducted as follows. Program control portion 112 obtains a variable storing effective execution time, a parameter for a dissolve command. Referring to the variable initial value portion, effective execution time (16 seconds, for example) is obtained. The initial value is set for variable 1.

Then in step S35, a combining ratio is output. This is conducted as follows. Since effect execution time is selected from predetermined candidates, a combining ratio is calculated based on a table for combining which associates the effect time with a combining ratio of a memory for ON AIR and a memory for NEXT, and produced combining ratio information is output to combining portion 104.

Then, in step S36, information indicating a command for combining is output to picture plane management portion 110, and the memory No. M1 of ON AIR and the memory No. M2 of NEXT are output to combining portion 104.

Accordingly, combining portion 104 starts combining still picture data in order to execute a dissolve effect from ON AIR (memory M1) to NEXT (memory M2).

At the same time, as in step S37, picture plane management portion 110 updates the management table. Thus, ON AIR is designated with memory M2, NEXT is designated with memory M3, and second next is designated with memory M1.

Then, as in step S38, program control portion 112 instructs program counter 109 to update the value of the program counter, and adds "1" to the value of the program counter. Then, the process returns to step S31.

Thus updating the value of program counter 109 permits program counter 109 to specify the rectangular transfer command in item 2 in step S31. Accordingly, after execution of the dissolve command in item 1, a rectangular transfer processing according to the rectangular transfer command is executed during execution of the dissolve effect requiring a prescribed time period (16 seconds) until the end of the effect.

Since the rectangular transfer command is not a combining command, the process moves from step S32 to S39. In step S39, it is determined whether or not a command to executed is a transfer command. Since the rectangular transfer command is a transfer command, the process proceeds to step S40.

In step S40, it is determined whether or not a value is set for a variable corresponding to the command. If it is determined that no value is set therefor, the process proceeds to step S41 and an initial value is set for the variable. This is conducted as follows. Parameters for a rectangular transfer command, in other words transfer destination information including coordinates at the initial point of a rectangular region at the transfer destination, sizes in vertical and horizontal directions and memory information, and transferring side information including coordinates at the initial point of the rectangular region at the transferring side and memory information are obtained as variables. Then, referring to the variable initial value portion, various kinds of information are obtained. An initial value is then set for each variable.

More specifically stated, the following initial values are set. Coordinates (variable 2, variable 3) at the initial point of the rectangular region at the transfer destination is set to (0, 0). The vertical and horizontal sizes of the rectangular region at the transfer destination (variable 4, variable 5) are set to (vertical 100, horizontal 400). Memory information at the transfer destination (variable 6) is set to SECOND NEXT. Coordinates at the initial point of the rectangular region at the transferring side (variable 7, variable 8) are set to (0, 0). Memory information at the transfer destination (variable 9) is set to ON AIR.

The transfer destination information is used to specify a memory and a region at the transfer destination in storage portion 103. The transferring side information is used to specify a memory and a region at the transferring side in storage portion 103.

Then, as shown in step S42, program control portion 112 outputs memory information (SECOND NEXT) at the transfer destination and memory information (ON AIR) at the transferring side to picture plane management portion 110. Corresponding memory numbers (M1 for the transfer destination, M2 for the transferring side) are output to transfer portion 111 based on the management table. Program control portion 112 outputs coordinates at the initial point of the rectangular region at the transfer destination, sizes in longitudinal and transverse directions, and coordinates at the initial point of the rectangular region at the transferring side to transfer portion 111.

Accordingly, as in step S43, still picture data is transferred by transfer portion 111 as follows.

Transfer portion 111 transfers an image in a region having the same rectangular size as the transferring side (an image in a rectangular region having (0, 0) and (100, 400) as diagonal limits) starting from the coordinate information of the memory (M2) at the transferring side to a rectangular region of the same size originating from the coordinate information of memory (M1) at the transfer destination (a rectangular region having (0, 0) and (100, 400) as diagonal limits).

In this case, memory M2 plays both roles of a transfer buffer for storing still picture information at the transferring side and a switching destination memory by means of a dissolve effect. After transfer of such still picture data, as shown in step S44, program control portion 112 obtains coordinates at the transfer destination, the size of rectangle, and increment/decrement values (constants) for coordinates at the transferring side from program storage portion 108.

These values are obtained as follows. (0, +100) is obtained for the coordinates at the transfer destination. (Vertical 0, horizontal 0) is obtained for the rectangular sizes. (0, +100) is obtained for the coordinates at the transferring side. Then, as shown in step S45, the above-described increment/decrement values are added to the variables storing the coordinates and rectangular sizes at the transfer destination and variables storing the coordinates at the transferring side.

Thus adding the increment/decrement values to the variables produces the following variables. The variable storing the coordinates at the transfer destination (variable 2, variable 3) become (0, 100). The variable storing the rectangular sizes at the transfer destination (variable 4, variable 5) become (vertical 100, horizontal 400). The variable storing the coordinates at the transferring side (variable 7, variable 8) become (0, 100).

Then, in step S46, "1" is added to the value of program counter 109. Thus, the process returns to S31, the loop command in item 3 is to be processed. Program control portion 112 obtains the loop command in item 3 and parameters (constants) corresponding thereto, i.e. a loop number and a label number from program storage portion 108.

Then, the process proceeds to step S47 via steps S32 and S39. In step S47, it is determined whether or not a command to be executed is a loop command. If the command is a loop command the process proceeds to step S48. Program control portion 112 then moves the process to step S31 via steps S48, S49, and S50.

Thus, program control portion 112 moves the process to a command having the same label number. The destination to which the process is moved is the rectangular transfer command in item 2.

In the above-described step S48, a processing of decreasing the loop number by 1 is conducted. If the loop number is 11, for example, the loop number is updated to 10. In step S49 following step S48, it is determined whether or not the loop number is equal to "0". If the loop number is not equal to 0 as a result, the processing is moved to step S50. In step S50, the value of program counter 109 is set so as to specify the rectangular transfer command in item 2.

If the processing of the rectangular transfer command is once again executed by the loop command, the processing is conducted as follows.

Program control portion 112 obtains the transfer command in item 2 according to program counter 109 from program storage portion 108. At the time, the variables storing the coordinates at the transfer destination has already been (0, 100). The variable storing the rectangular sizes at the transfer destination are (vertical 100, horizontal 400). The variables storing the coordinates at the transferring side are set to (0, 100).

Therefore, based on these variables, variables storing memory information at the transfer destination (SECOND NEXT), and the variables storing memory information at the transferring side (ON AIR), transfer of still picture is conducted as is the case with the above. After the transfer of still picture, each variable is updated by adding each increment/decrement value to each variable.

The loop command in item 3 is repeatedly executed, and the transfer command in item 2 and the loop command in item 3 are repeated until the loop number becomes "0" as in step S49. More specifically, if the loop number is not equal to "0" in step S49, the process proceeds to step S31 via step S50 as described above.

When the loop number is "0", the process proceeds to step S51, and "1" is added to the value of the program counter in step S51. Thus, the processing according to the loop command is completed.

Thus, repeating the rectangular transfer command in item 2 and the loop command in item 3 creates the following states of display on the picture plane of monitor 106. More specifically, a rectangular region having 100 pixels in the vertical direction and 400 pixels in the horizontal direction is sequentially transferred from the limit on the upper left of the picture plane in the vertical direction along the left side of the picture plane, and an image of one row on the left side of the picture plane (400 pixels wide) is superimposed.

Then, although the description is omitted in the effect program in FIG. 3, the image transfer position is moved to an upper right neighboring position of the region superimposed on the picture plane by means of the effect program, and similarly, the rectangular region of vertical 100 pixels, and horizontal 400 pixels are transferred one after another for vertical one row (400 pixels wide) along the superimposed region. As a result of transfer, the effect program is completed when the entire picture plane is transferred. Such a processing is also described in the effect program.

Accordingly, the still picture in memory M2 is sequentially transferred to memory M1 on a one row basis in the vertical direction (width 400 pixels). As a result of the transfer, when the entire still picture in memory M2 is transferred to memory M1, the process proceeds to S52, and program control portion 112 executes the command in item N, thus completing the effect program.

At the time, the execution time of the dissolve effect by the dissolve command (16 seconds, for example) is far longer than time since the start of transfer of still picture data according to one rectangular transfer command to the end of the transfer. Therefore, a number of transfer commands can be executed until the dissolve effect is completed.

Accordingly, with a dissolve effect being in progress, rectangular images from memory M2 at the transferring side are transferred one after another for the still picture (still picture stored in memory M1) fading by means of the dissolve effect at monitor 106. Thus, in addition to the dissolve effect, one can see how images are transferred onto the display picture one after another, and a different kind of eccentric image effect can be implemented.

Figure 11:
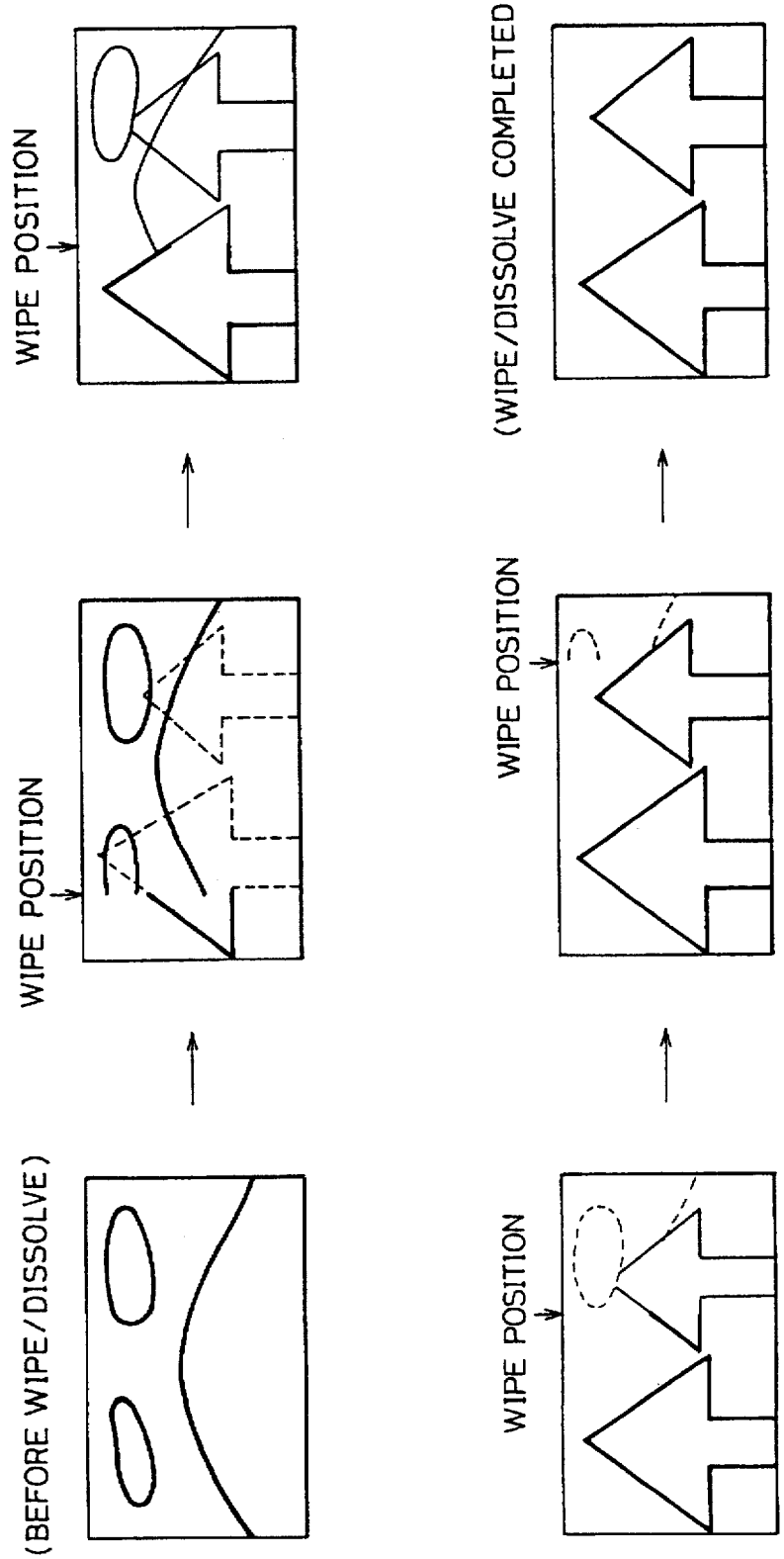
FIG. 11 is a view showing one example of a special image effect obtained in the image reproduction apparatus in FIG. 1.

One example of such a special image effect is shown in FIG. 11. Referring to FIG. 11, by the special image effect, images are transferred in addition to a dissolve effect as described above. Referring to FIG. 11, the image displayed changes with time in the order indicated by the arrow. More specifically, a still picture having a schematic illustration of a mountain and clouds is displayed first, and as the image is faded by means of a dissolve effect simultaneously with rising of a still picture having a schematic illustration of two trees, the two trees are gradually brought into a clear image from the left side of the picture plane by transfer of the still picture data.

In addition, since such a special image effect is implemented by conducting a dissolve effect and transfer of an image in parallel, change of hardware is not included, and cost increase for hardware to implement such a special image effect can be prevented.

Which takes time between switching from still picture in memory M1 to still picture memory M2 by means of a dissolve effect (which takes about 16 seconds) and transfer of the entire still picture data in memory M1 to memory M2 by image transfer varies depending upon effect programs, and the present invention is illustrated by way of the example.

In the second embodiment, the case in which a combining command such as a dissolve command is executed only once has been described, but the invention is not limited to such a case. Two combining commands are sometimes executed successively, for example, in which case program control portion 112 holds off execution of the end command until such combining processings are completed. And the end command may be executed after the end of such combining processing.

Note that in the second embodiment, still picture data in a rectangular region is entirely transferred to one frame of memory at a transfer destination for superimposing the entire picture plane, the present invention is not limited thereto. For example, coordinates at the initial point of a rectangular region at a transfer destination may be fixed, and coordinates at the initial point of a rectangular region at a transferring side may be moved by several pixels every one transfer. Thus, on the fixed rectangular region of the still picture at the transfer destination, the image may be transferred as if part of the still picture at the transferring side rolls, and simultaneously a dissolve and a wipe may be executed.

Transfer of still picture data is not limited to a rectangular region, and data may be transferred from a memory at a transferring side (one of M1, M2, and M3) to a memory at a transfer destination (one of M1, M2, and M3) on the basis of an amount corresponding to one line in the vertical direction or in the horizontal direction.

Although in the above-described effect programs, although transfer destination information and transferring side information are specified as parameters for rectangular transfer commands, but they may be specified otherwise.

More specifically, if part (or all) of transfer destination information and part (or all) of transferring side information are the same, only that part (or all) of either one of the information may be omitted in specifying parameters.

For example, if initial point coordinates at a transfer destination and initial point coordinates at a transferring side are the same, the initial coordinates at the transferring side may be omitted in specifying parameters. At the time, program control portion 112 interprets the initial point information at the transfer destination specified as a parameter also as the initial point information at the transferring side.

Note that the foregoing embodiments have been described simply by way of illustration, and various modifications are possible to the present invention as needed, and the present invention recited in the appended scope of claims includes all of such modifications.

The functional blocks in the foregoing embodiments may be formed of software or hardware as necessary, and the present invention by all means includes both configurations.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A program execution apparatus for displaying an image according to program information, comprising:
   comment statement detection means for detecting a comment statement in program information including a plurality of program code statements and a comment statement which corresponds to one of said plurality of program code statements for reproducing an image;
   determination means for determining the presence/absence of prescribed code information in the comment statement detected by said comment statement detection means; and
   program processing means for executing a processing according to an instruction for reproducing an image corresponding to said prescribed code information in the comment statement, and ignoring said program code statement for reproducing an image corresponding to the comment statement, if said determination means determines the presence of said prescribed code information in said comment statement.

2. A program execution apparatus as recited in claim 1, wherein
   said prescribed code information is formed of a particular character string present at a prescribed position of said comment statement, and
   said determination means determines the presence/absence of said prescribed code information by determining the presence/absence of said particular character string in the comment statement detected by said comment statement detection means.

3. A program execution apparatus controlling display of images at an image reproduction apparatus based on program information, comprising:
   comment statement detection means for detecting a comment statement in program information including a plurality of program code statements and the comment statement which corresponds to one of said plurality of program code statements;
   determination means for determining the presence/absence of prescribed code information for switching images for display by means of an image effect inherent in said image reproduction apparatus in the comment statement detected by said comment statement detection means; and
   program processing means for executing a processing according to a program code statement without a corresponding comment statement and a program code statement without the prescribed code information in a corresponding comment statement, executing a processing according to an instruction corresponding to said prescribed code information in the comment statement, and ignoring said program code statement corresponding to the comment statement, if said determination means determines the presence of said prescribed code information in said comment statement.

4. A program execution apparatus controlling display of images at an image reproduction apparatus based on program information, comprising:
   comment statement detection means for detecting a comment statement in program information including a plurality of program code statements and the comment statement which corresponds to one of said plurality of program code statements;
   determination means for determining the presence/absence of prescribed code information in the comment statement detected by said comment statement detection means, said prescribed code information including type information indicating the type of an image reproduction apparatus to which the program apparatus is applicable and prescribed code information for switching images by means of an image effect inherent in the image reproduction apparatus;
   storage holding means for holding stored type information inherent in said image reproduction apparatus;
   comparison means for comparing type information included in said comment statement and the stored type information held by said storage holding means; and
   program processing means for executing a program code statement without a corresponding comment statement, executing a processing according to a program code statement corresponding to the comment statement including the type information when the type information compared at said comparison means are not in agreement with each other, executing a processing according to an instruction corresponding to said prescribed code information included in the comment statement, and ignoring the program code statement corresponding to the comment statement including the type information, when the type information compared at said comparison means are in agreement with each other.

5. A method of displaying an image based on program information, comprising the steps of:
   determining the presence/absence of prescribed code information in a comment statement in program information including a program code statement for reproducing an image and the comment statement;
   executing a processing according to said program code statement for reproducing an image, and ignoring the comment statement when it is determined that said prescribed code information is not present in said comment statement; and
   inserting a processing according to an instruction for reproducing an image corresponding to said prescribed code information for execution between the processings according to said program code statement, when it is determined that said prescribed code information is present in said comment statement.

6. A method as recited in claim 5, comprising a step of prohibiting a processing according to a program code statement at a prescribed position, when it is determined that said prescribed code information is present in said comment statement.

7. A method of displaying an image based on program information, comprising the steps of:

extracting a program code statement for reproducing an image from program information including the program code statement and a comment statement;

detecting said comment statement in said program information;

executing a processing according to the extracted program code statement for reproducing an image if said comment statement is not detected;

determining the presence/absence of prescribed code information in the comment statement if said comment statement is detected;

executing a processing according to said program code statement for reproducing an image, and ignoring the comment statement, when it is determined that said prescribed code information is not present in said comment statement; and inserting a processing according to the instruction for reproducing an image corresponding to the prescribed code information for execution, between processings according to said program code information when it is determined that said prescribed code information is present in said comment.

8. A method of displaying an image based on program information, comprising the steps of:

detecting a comment statement in program information including a program code statement for reproducing an image and the comment statement;

extracting said program code statement for reproducing an image from said program information if said comment is detected, and executing a processing according to the extracted program code statement;

determining the presence/absence of prescribed code information in said comment statement, if said comment statement is detected;

extracting said program code statement for reproducing an image from said program information and executing the processing according to the program code statement for reproducing an image, and ignoring the comment statement when it is determined that said prescribed code information is not present in said comment statement; and inserting a processing according to an instruction for reproducing an image corresponding to said prescribed code information for execution between the processings according to said program code information, when it is determined that said prescribed code information is present in said comment statement.

9. A method of displaying an image based on program information, comprising the steps of:

extracting a program code statement for reproducing an image from program information including a row of a program code statement and a row of a program code statement provided with a comment statement;

detecting said comment statement in said program information;

executing a processing according to a program code statement for reproducing an image of a row of program code information in which said comment statement is not detected;

determining the presence/absence of prescribed code information in the comment statement when said comment statement is detected;

executing a processing according to the program code statement for reproducing an image exclusive of the comment statement when it is determined that the prescribed code information is not present in said comment statement; and executing a processing according to an instruction for reproducing an image corresponding to the prescribed code information in place of the program code statement for reproducing an image in the row provided with the comment statement, when it is determined that said prescribed code information is present in said comment statement.

10. A method of displaying an image based on program information, comprising the steps of:

extracting a program code statement for reproducing an image from program information including a row of a program code statement and a row of a comment statement;

detecting said comment statement in said program information;

executing a processing according to the extracted program code statement for reproducing an image when said comment statement is not detected;

determining the presence/absence of prescribed code information in the comment statement, when said comment statement is detected; and executing a processing according to said program code statement for reproducing an image and ignoring the comment statement, when it is determined that said prescribed code information is not present in said comment statement; and executing a processing according to an instruction for reproducing an image corresponding to the prescribed code information in place of a processing according to a program code statement for reproducing an image in a row in a prescribed positional relation with the row of the comment statement, when it is determined that said prescribed code information is present in said comment statement.

11. A method of displaying an image based on program information, comprising the steps of:

extracting a program code statement for reproducing an image from program information including a row of program code statement and a row of a comment statement;

detecting said comment statement in said program information;

executing a processing according to the extracted program code statement for reproducing an image if said comment statement is not detected;

determining the presence/absence of prescribed code information in the comment statement if said comment statement is detected;

executing a processing according to said program code statement for reproducing an image and ignoring the comment statement, when it is determined that said prescribed code information is not present in said comment statement; and executing a processing according to an instruction for reproducing an image corresponding to the prescribed code information in place of a processing according to a program code statement for reproducing an image in a row next to the comment statement, when it is determined that said prescribed code information is present in said comment statement.

12. A method of displaying an image based on program information, comprising the steps of:

- extracting a program code statement for reproducing an image from program information including a row of program code statement and a row of a comment statement;
- detecting said comment statement in said program information;
- executing a processing according to the extracted program code statement for reproducing an image, when said comment statement is not detected;
- determining the presence/absence of prescribed code information in the comment statement, when said comment statement is detected;
- executing a processing according to the extracted program code statement for reproducing an image and ignoring the comment statement, when it is determined that said prescribed code information is not present in said comment statement; and
- inserting between the processings according to said program code information a processing according to an instruction for reproducing an image corresponding to the prescribed code information for execution, when it is determined that said prescribed code information is present in said comment statement, and prohibiting execution of a processing according to a program code statement for reproducing an image in a prescribed positional relation with the row of the comment statement.

13. A program execution apparatus for displaying an image based on program information comprising:

- comment statement detection means for detecting a comment statement in program information including a plurality of program code statements and a comment statement which corresponds to part of said plurality of program code statements;
- determination means for determining the presence/absence of prescribed code information in the comment statement detected by said comment statement detection means; and
- program processing means for executing a processing according to a program code statement for reproducing an image without a corresponding comment statement and a program code statement for reproducing an image without the prescribed code information in a corresponding comment statement, and when said determination means determines the presence of said prescribed code information in said comment statement, executing a processing according to an instruction for reproducing an image corresponding to said prescribed code information in the comment statement, and ignoring said program code statement for reproducing an image corresponding to the comment statement.

* * * * *